(12) United States Patent
Messner

(10) Patent No.: US 8,622,264 B2
(45) Date of Patent: Jan. 7, 2014

(54) CONTAINER HOLDER WITH FASTENERS

(76) Inventor: William Messner, Forest Park, IL (US)

( * ) Notice: Subject to any disclaimer, the term of this patent is extended or adjusted under 35 U.S.C. 154(b) by 476 days.

(21) Appl. No.: 12/677,549

(22) PCT Filed: Aug. 10, 2009

(86) PCT No.: PCT/US2009/053273
§ 371 (c)(1),
(2), (4) Date: Mar. 11, 2010

(87) PCT Pub. No.: WO2010/019501
PCT Pub. Date: Feb. 18, 2010

(65) Prior Publication Data
US 2010/0288801 A1 Nov. 18, 2010

Related U.S. Application Data

(60) Provisional application No. 61/088,895, filed on Aug. 14, 2008, provisional application No. 61/168,609, filed on Apr. 12, 2009, provisional application No. 61/172,798, filed on Apr. 27, 2009.

(51) Int. Cl.
*A45F 5/00* (2006.01)
(52) U.S. Cl.
USPC ............. 224/251; 224/148.4; 224/148.6; 224/250; 224/646; 224/649; 224/647; 24/265 H; 24/321; 24/169; 24/600.7

(58) Field of Classification Search
USPC ........ 224/148.1, 148.5–148.7, 250, 251, 407, 224/572, 649, 651, 269, 641, 646–648, 224/666–667; 248/102, 317, 318, 693, 248/690–692; 24/265 H, 318, 321, 343, 24/344, 346, 169, 198, 200, 543, 265 CD, 24/600.7, 3.12
See application file for complete search history.

(56) References Cited

U.S. PATENT DOCUMENTS

| | | | | |
|---|---|---|---|---|
| 304,840 | A * | 9/1884 | McIver | 24/165 |
| 2,490,207 | A * | 12/1949 | Cassile | 248/102 |
| 5,325,568 | A * | 7/1994 | Bruhm | 24/301 |
| 7,988,118 | B2 * | 8/2011 | Shye | 248/318 |

* cited by examiner

*Primary Examiner* — Adam Waggenspack

(57) ABSTRACT

One design embodiment of a holder for a container comprising: one or more bands each capable of retaining a container inside the band(s), with straps attached to and extending away from the exterior of the band(s); with fasteners on the ends of each strap such that container within the band or bands are held in a stable position relative to a harness to be worn by a user. The design embodiment allows easy attachment, use and deployment of containers in a variety of environmental conditions and situational uses, including but not limited to the carrying of gas supplies for underwater divers.

7 Claims, 27 Drawing Sheets

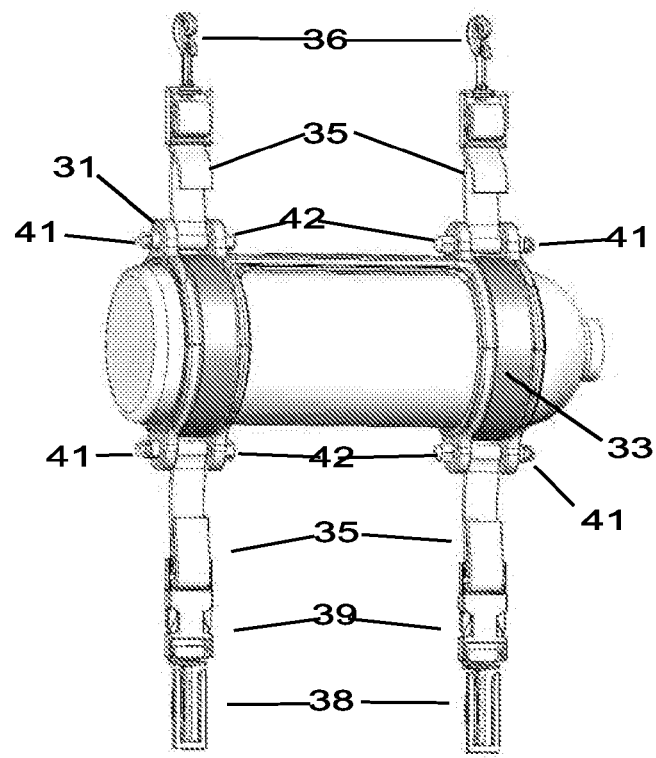
Fig 1-A
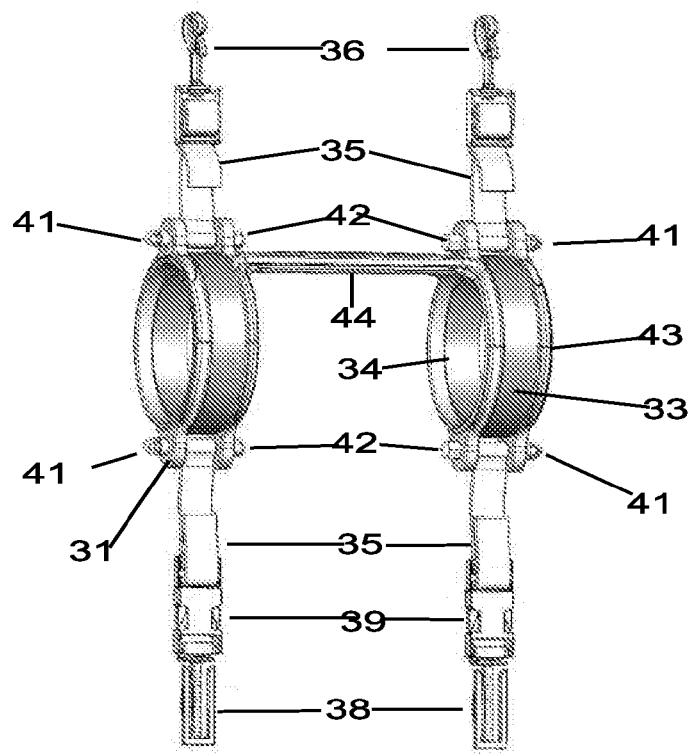
Fig 1-B

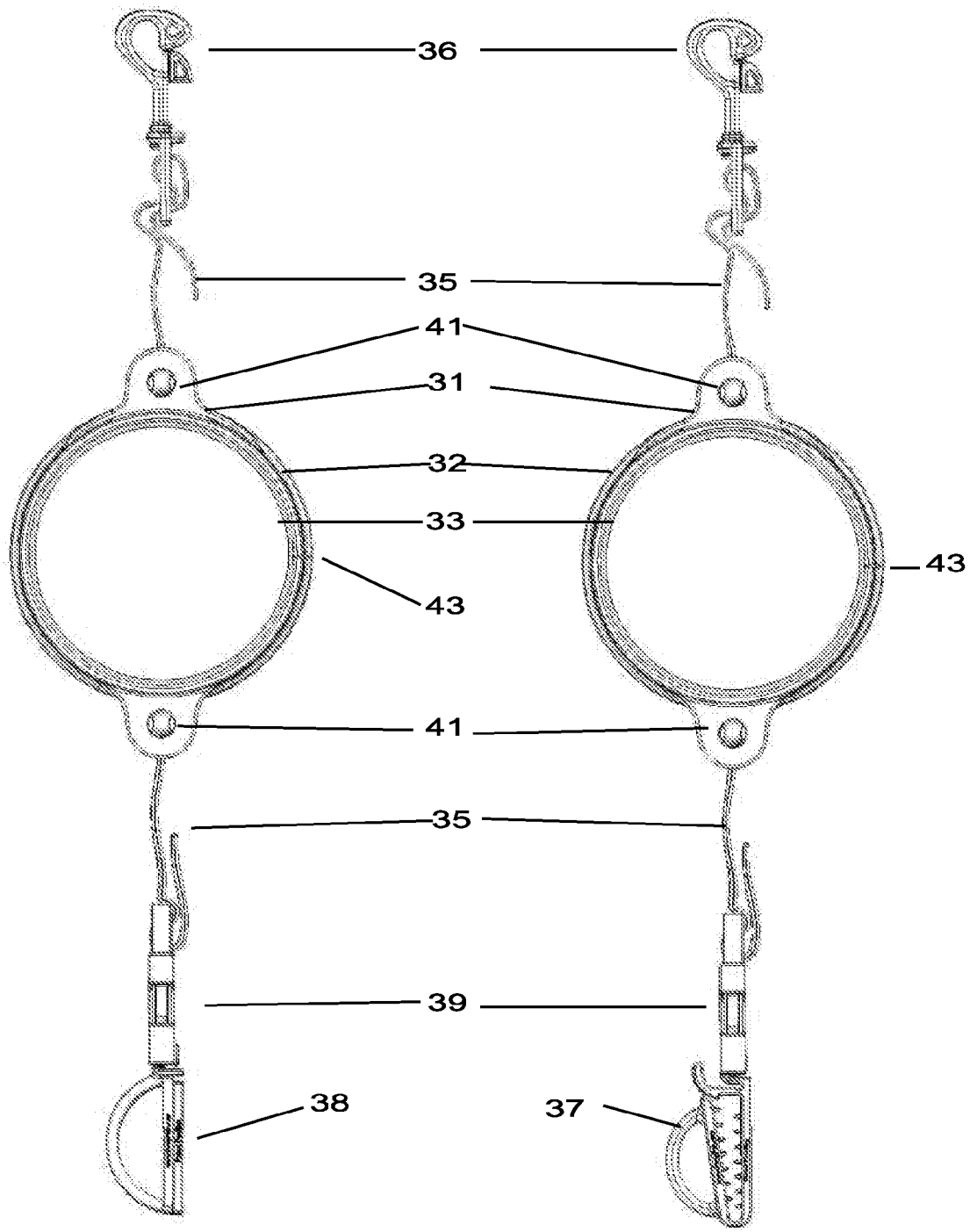
Fig 1-C    Fig 1-D

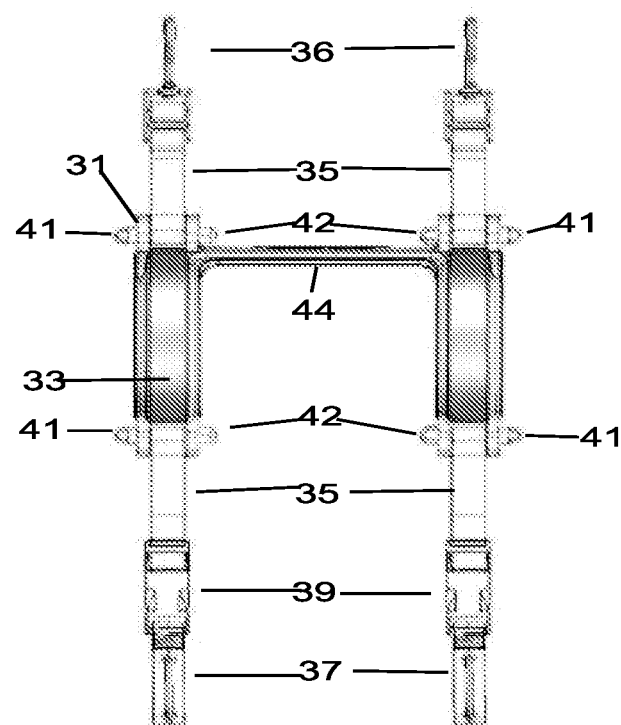
Fig 1-E
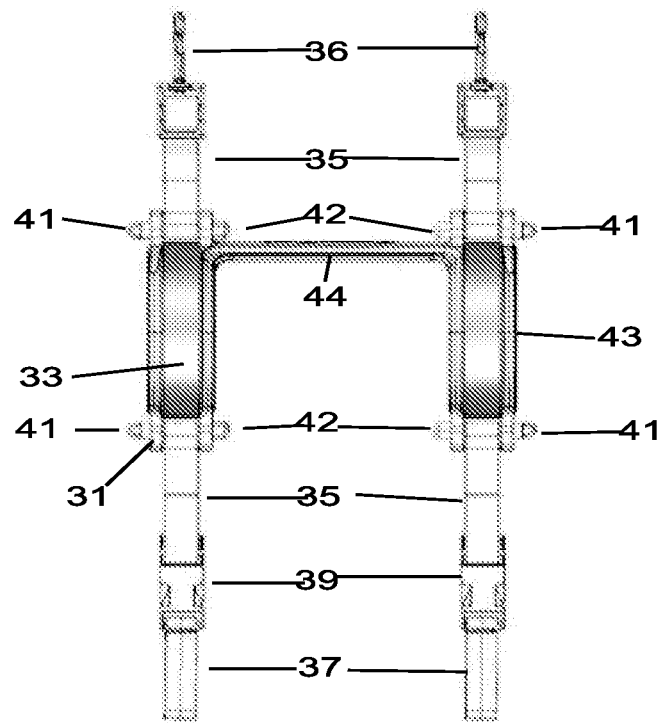
Fig 1-F

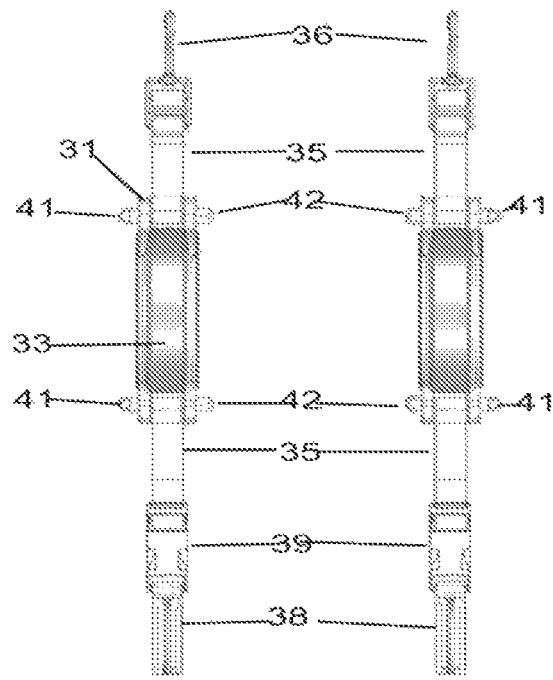
Fig 1-G
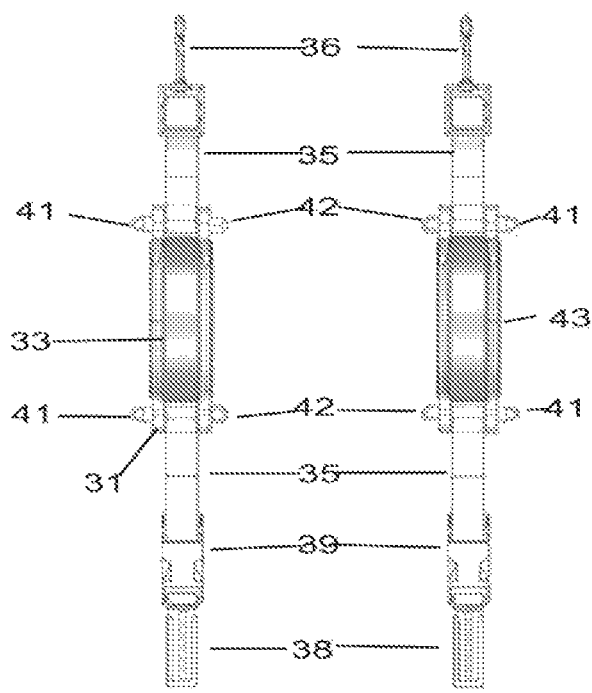
Fig 1-H

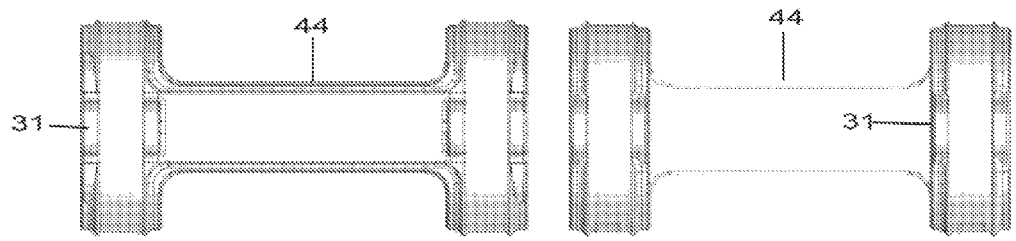
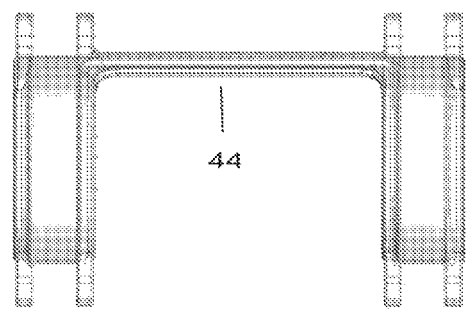
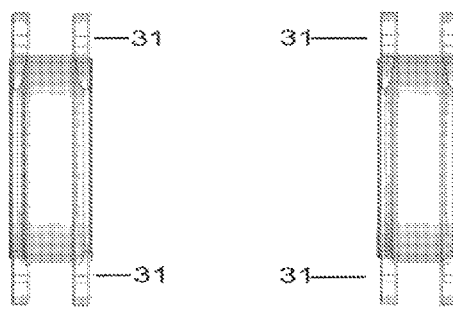

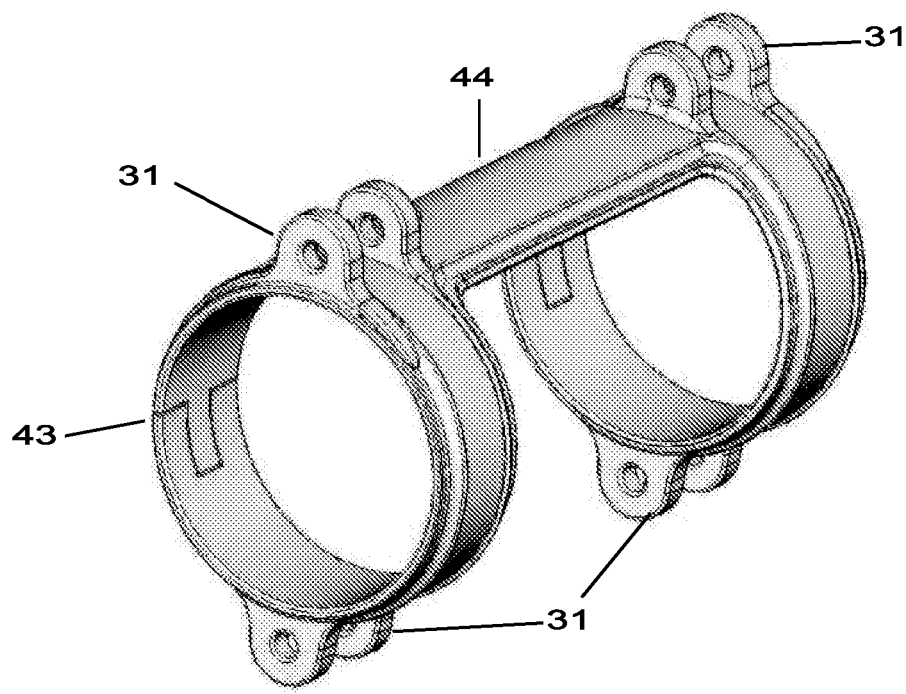
Fig 3-A
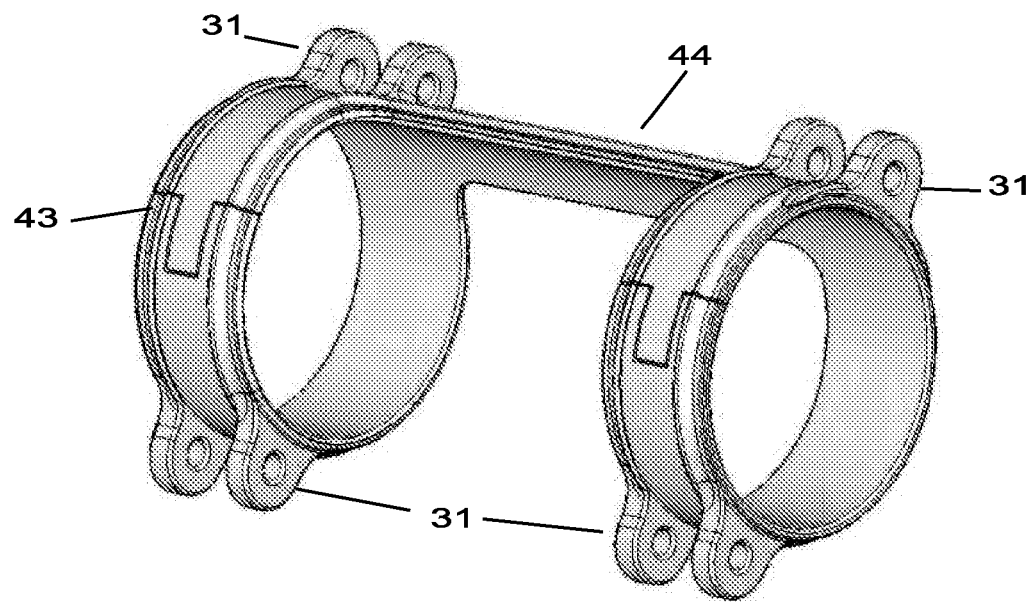
Fig 3-B

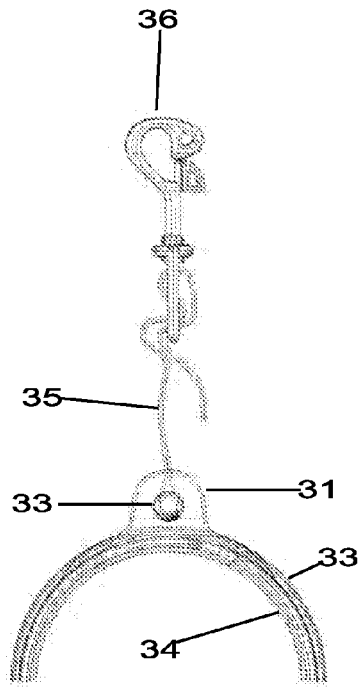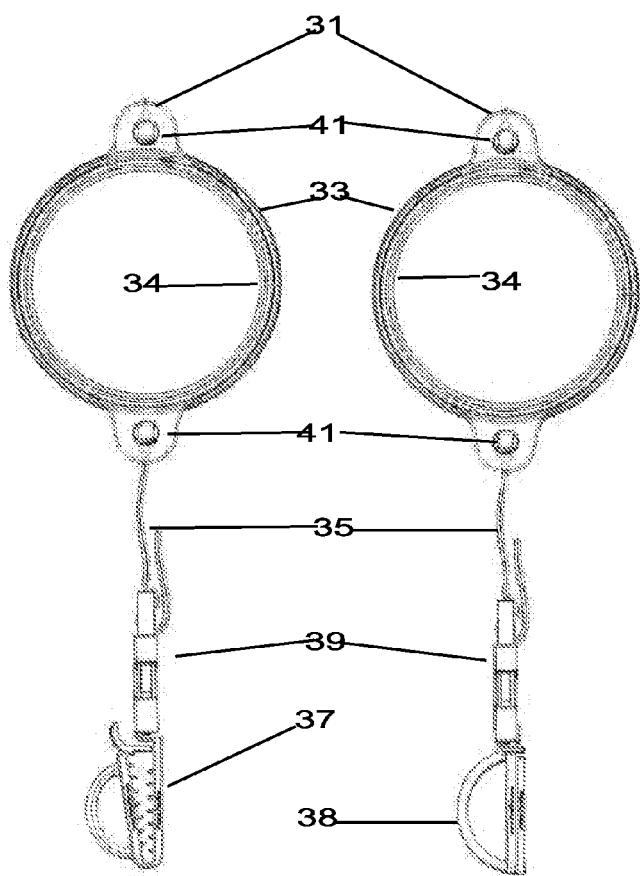
Fig 4-A  Fig 4-B  Fig 4-C

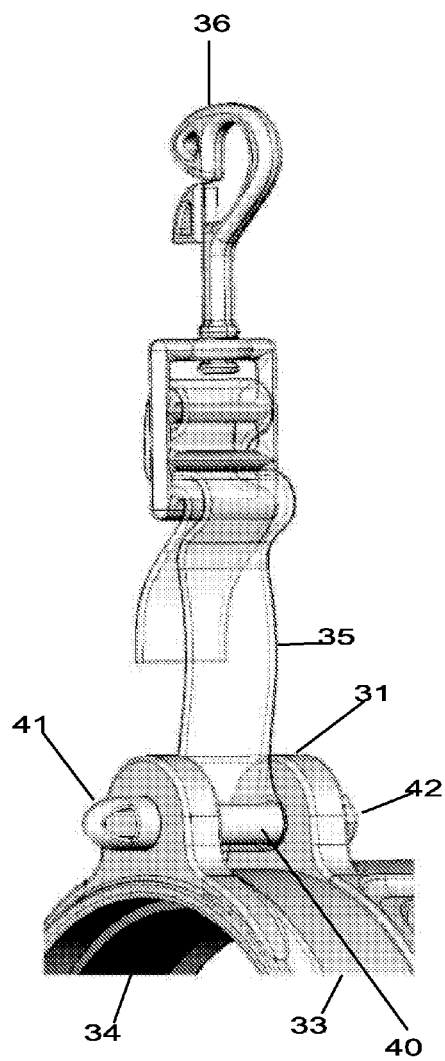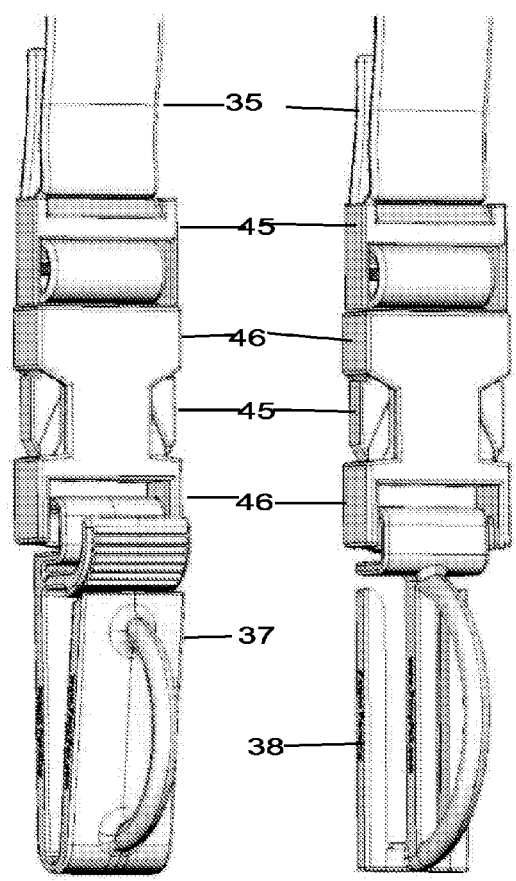
Fig 5-A    Fig 5-B    Fig 5-C

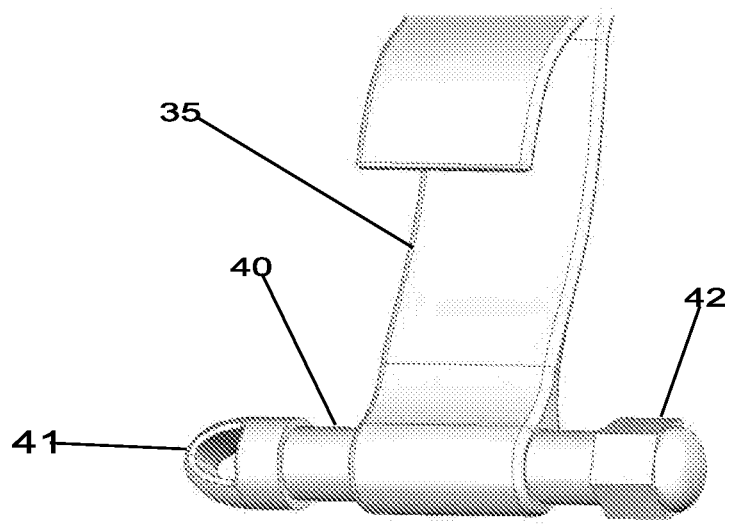
Fig 6-A
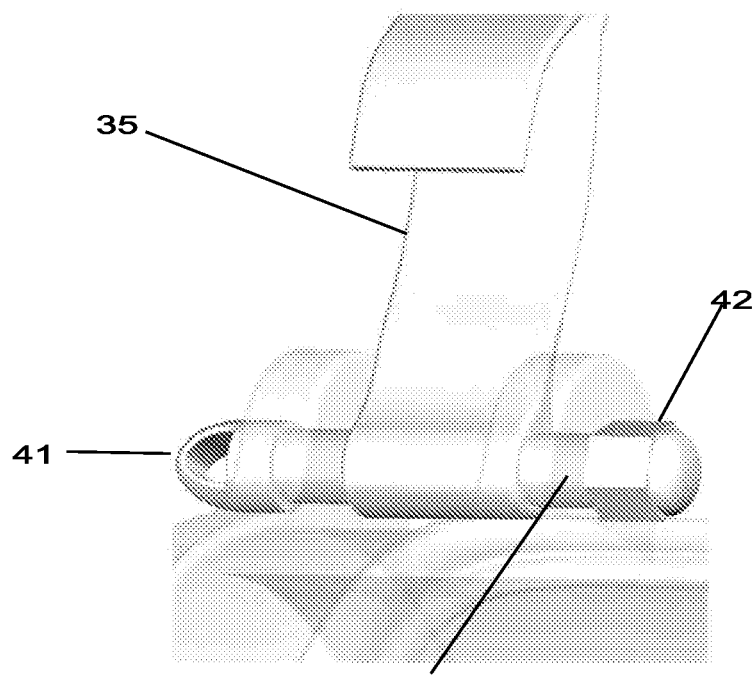
Fig 6-B
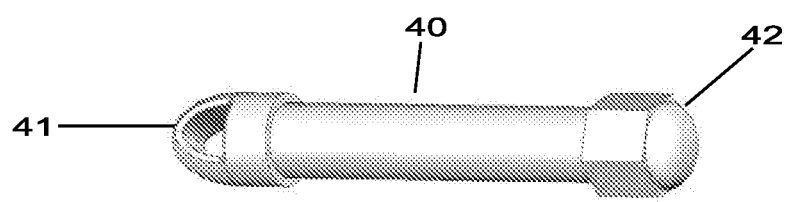
Fig 6-C

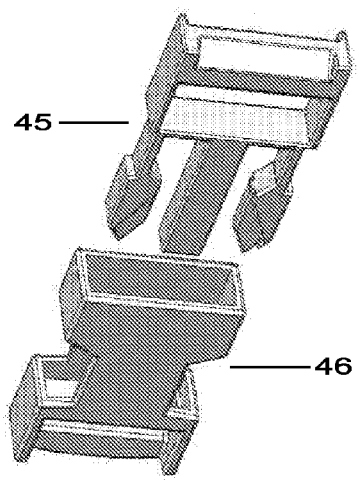
Fig 7-A
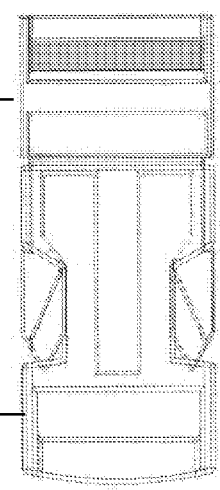
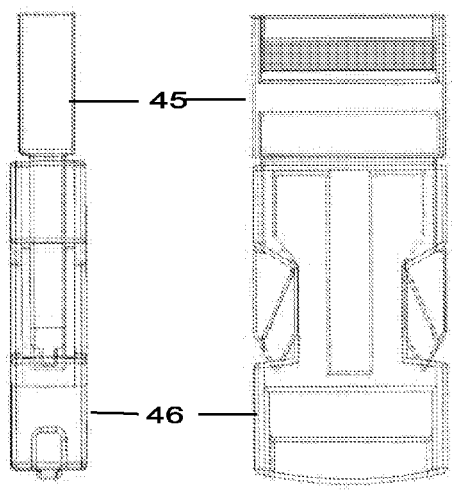
Fig 7-B     Fig 7-C
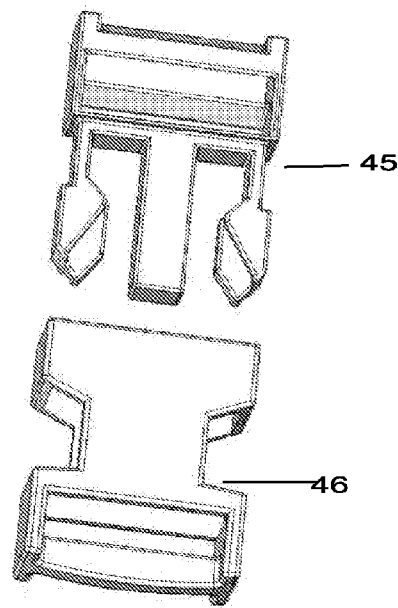
Fig 7-D
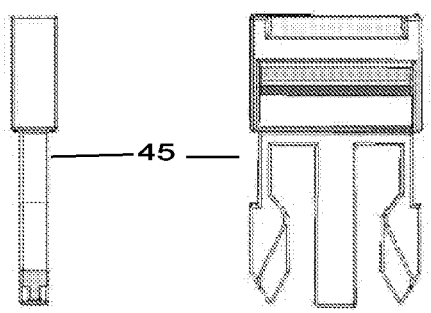
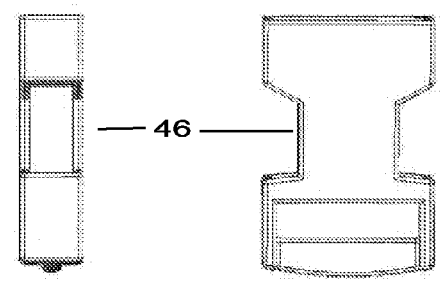
Fig 7-E     Fig 7-F

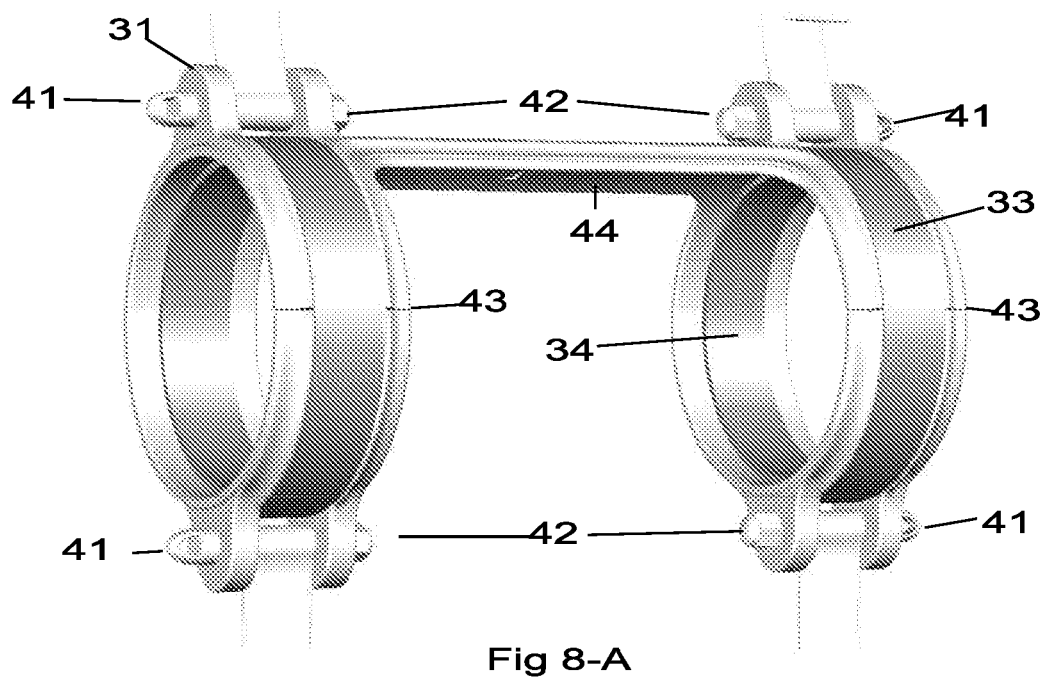
Fig 8-A
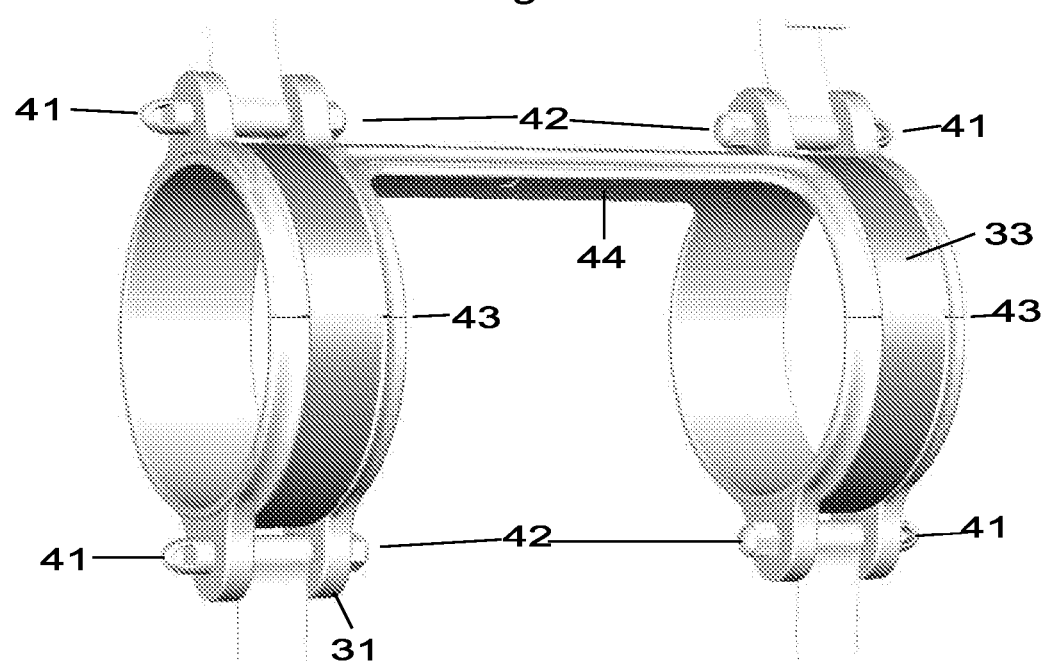
Fig 8-B

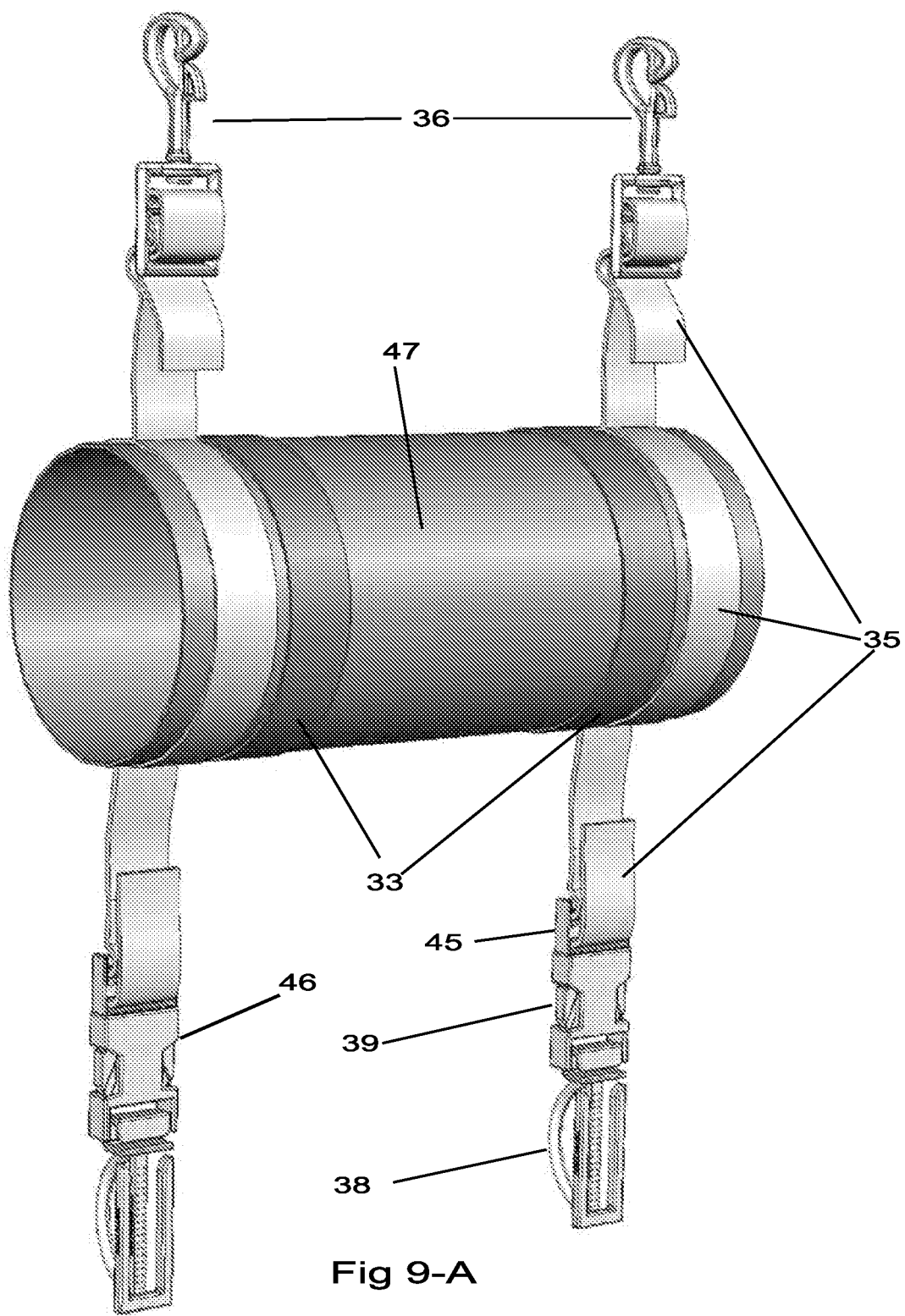
Fig 9-A

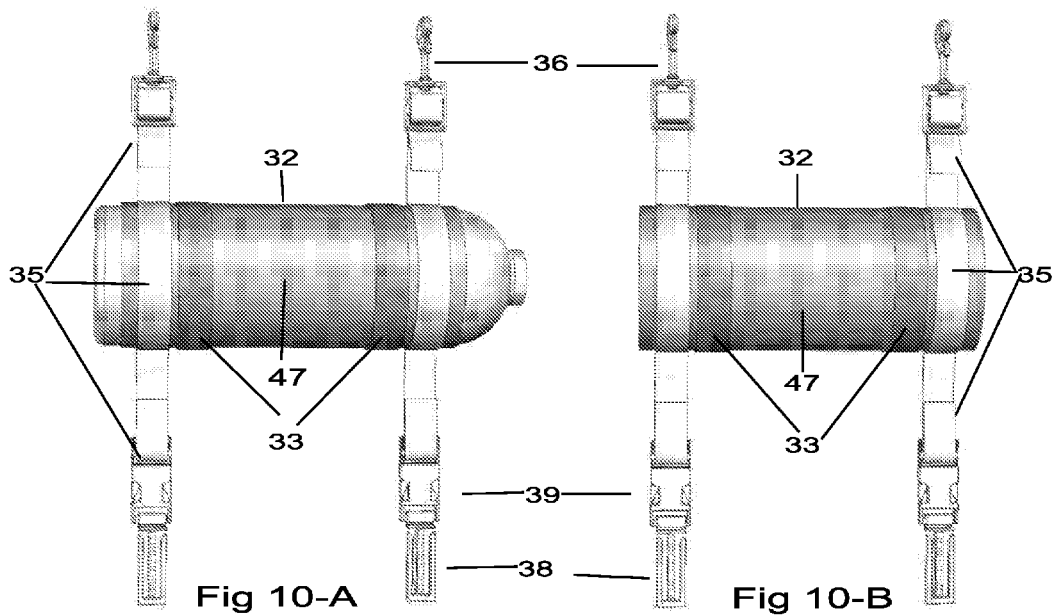
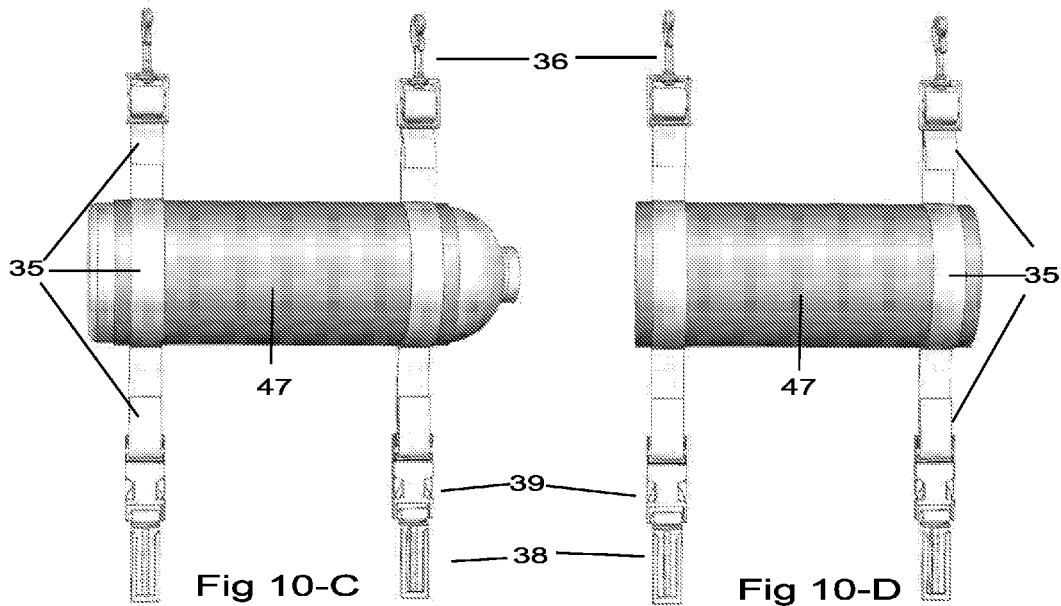

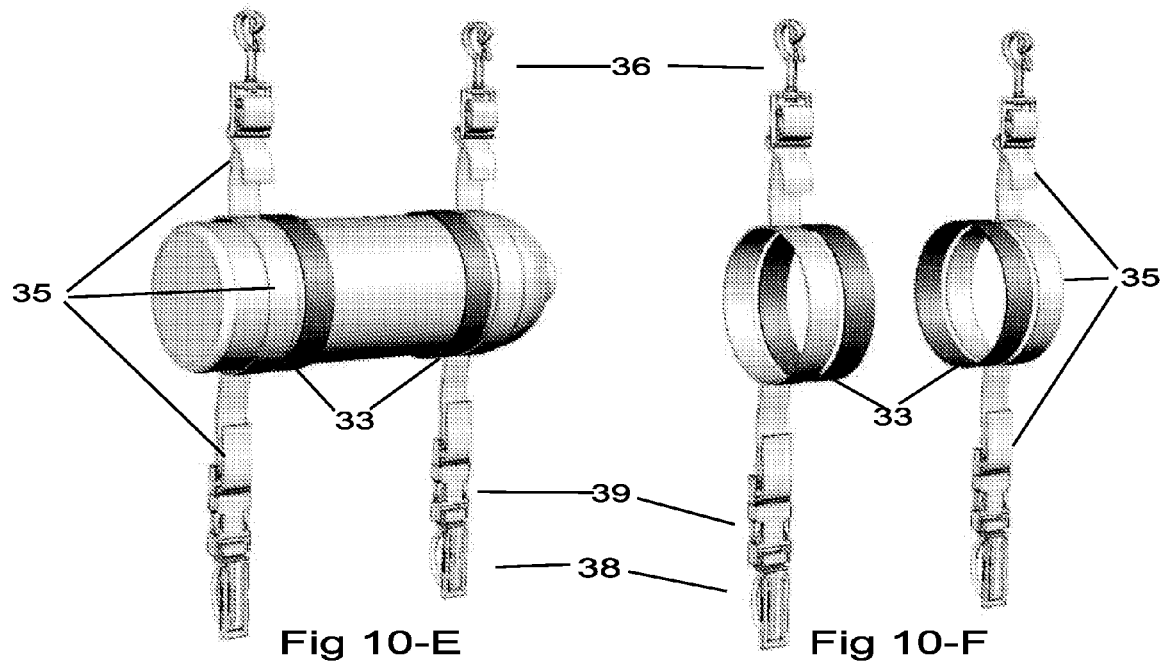
Fig 10-E    Fig 10-F
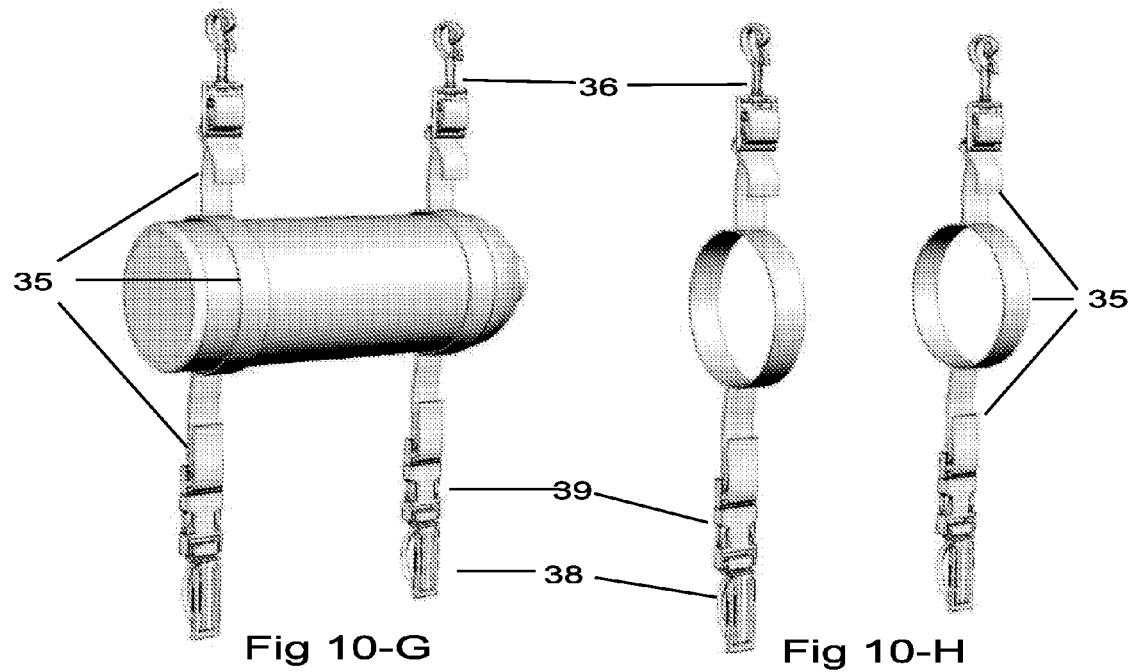
Fig 10-G    Fig 10-H

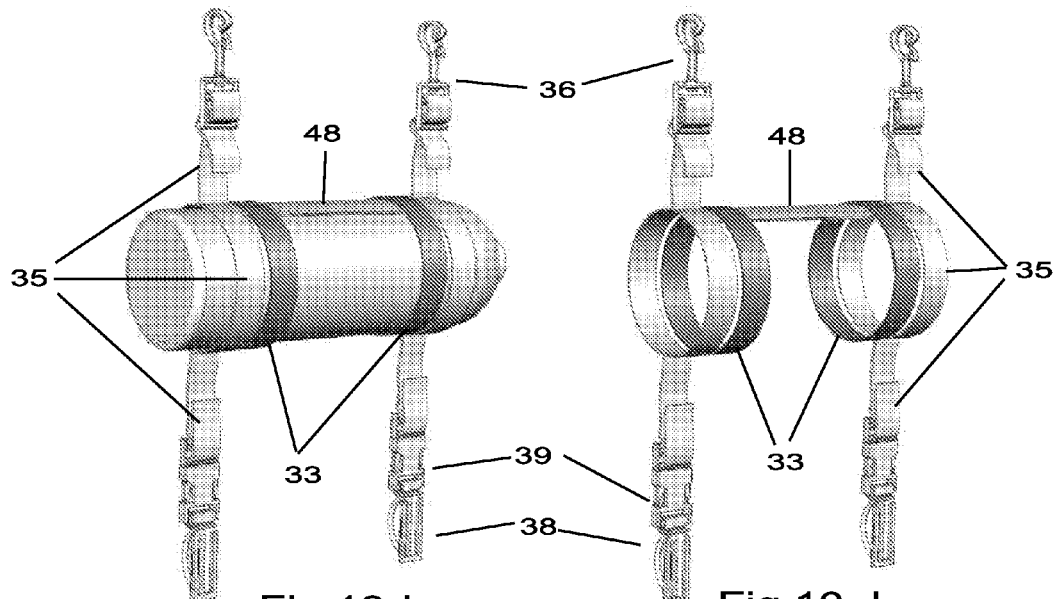
Fig 10-I    Fig 10-J
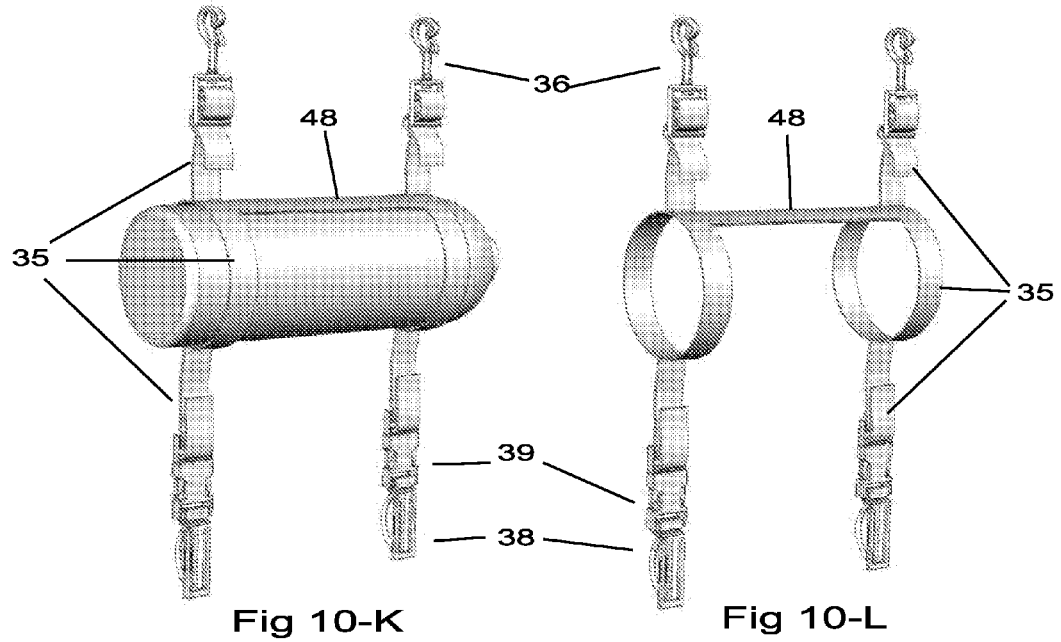
Fig 10-K    Fig 10-L

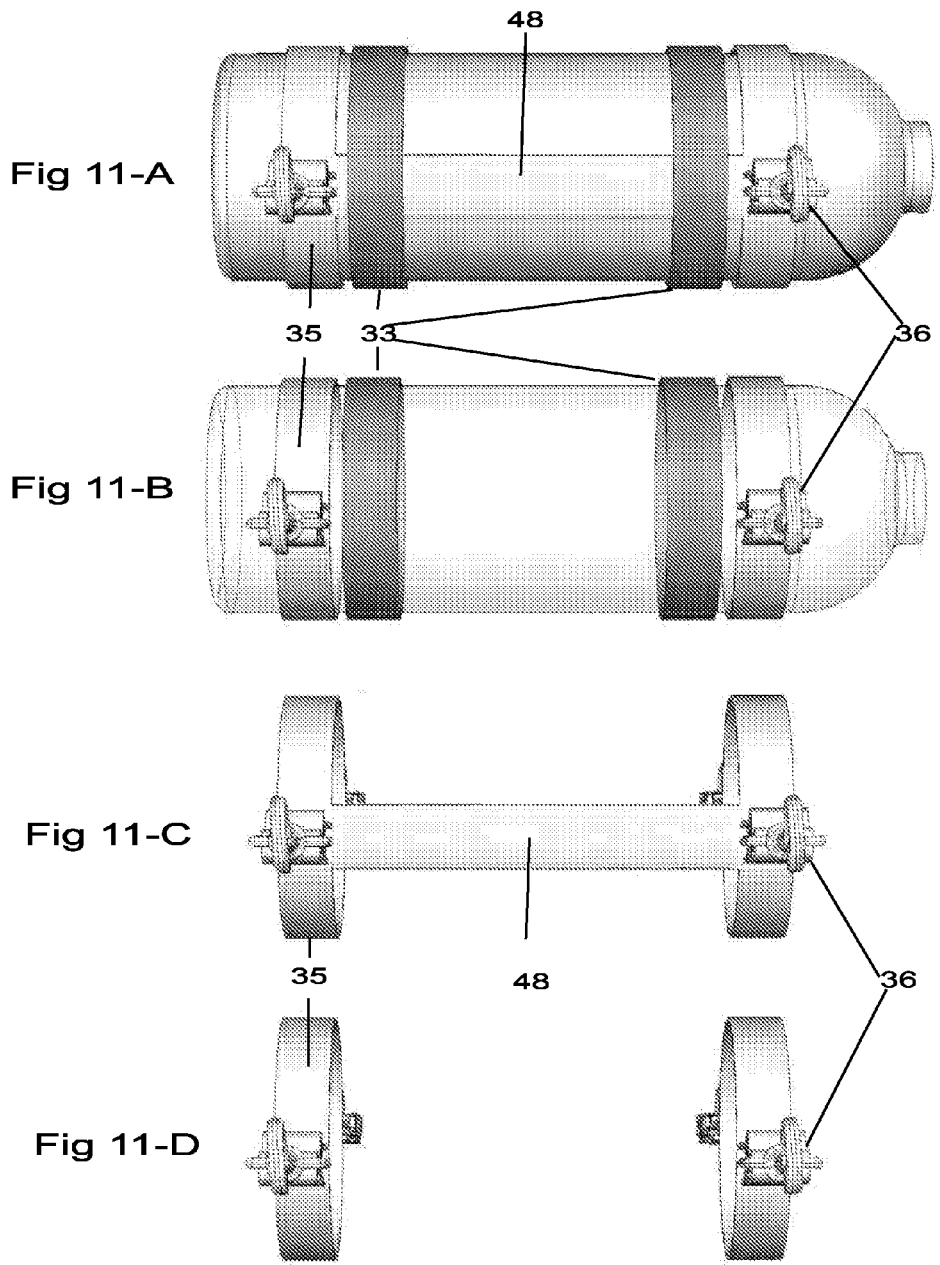
Fig 11-A
Fig 11-B
Fig 11-C
Fig 11-D

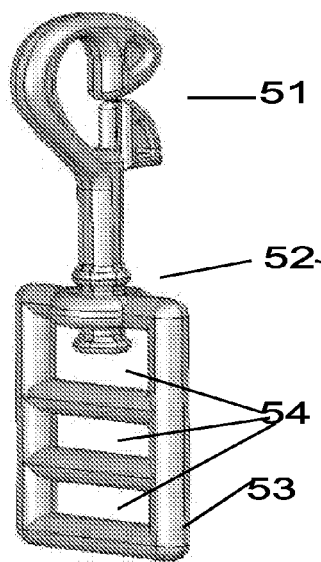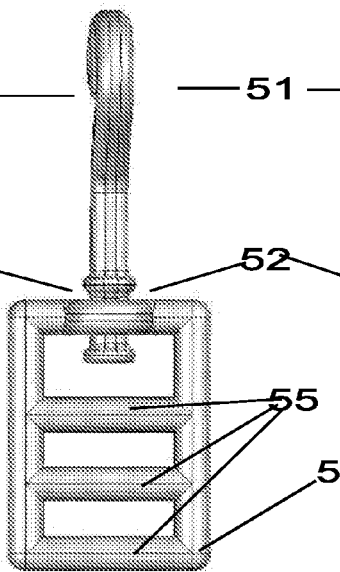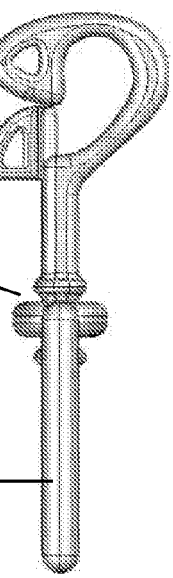
Fig 12-A    Fig 12-B    Fig 12-C
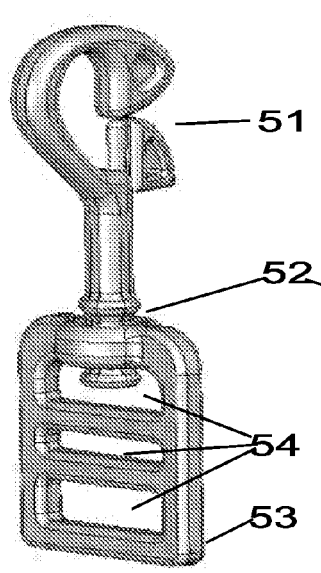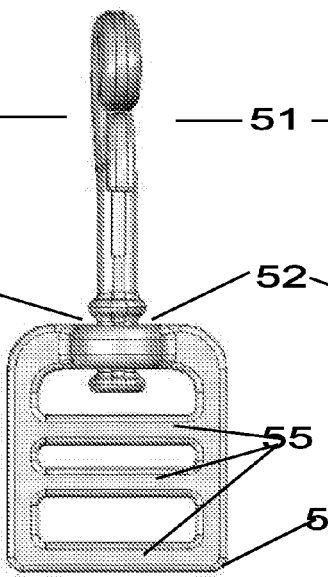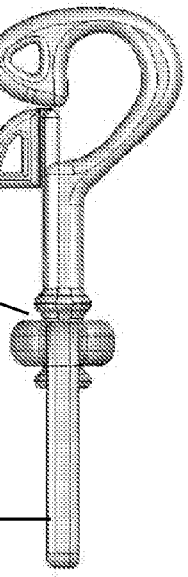
Fig 12-D    Fig 12-E    Fig 12-F

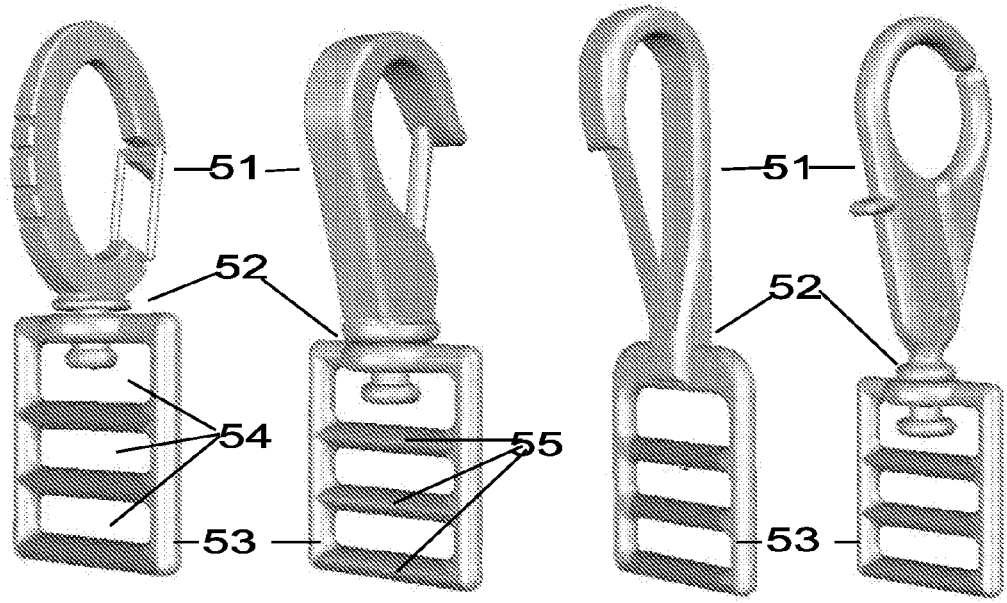
Fig 13-A    Fig 13-B    Fig 13-C    Fig 13-D
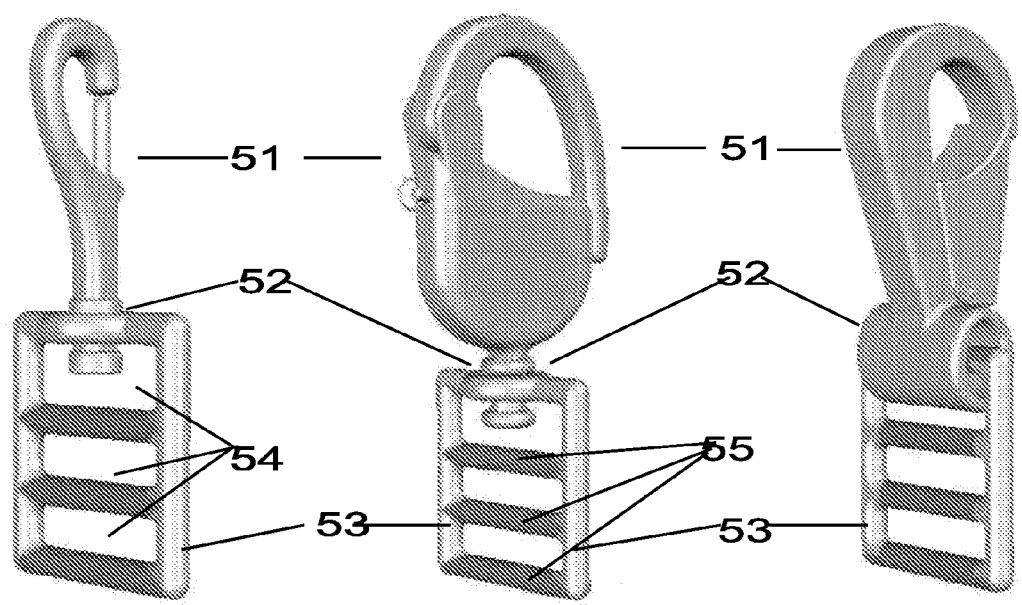
Fig 13-E    Fig 13-F    Fig 13-G

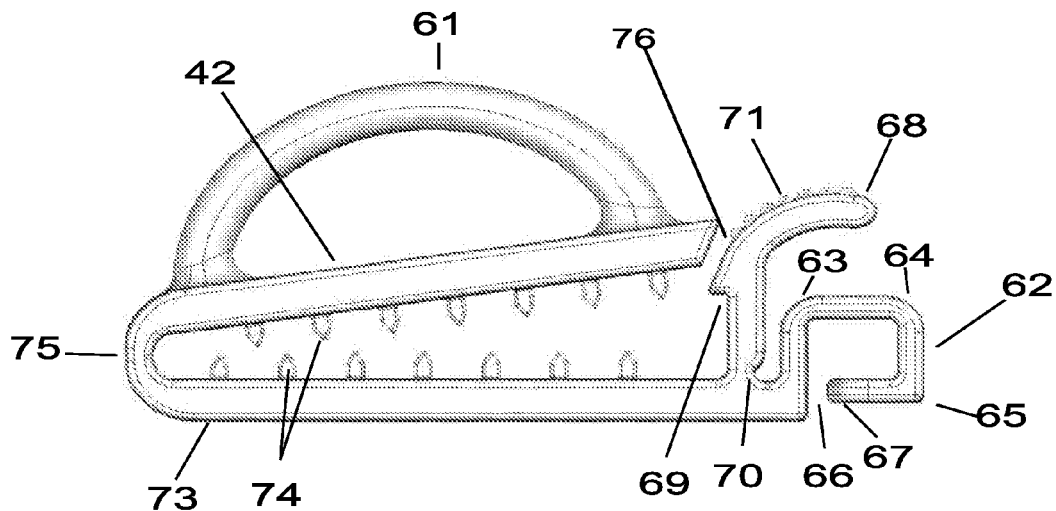
Fig 14-A
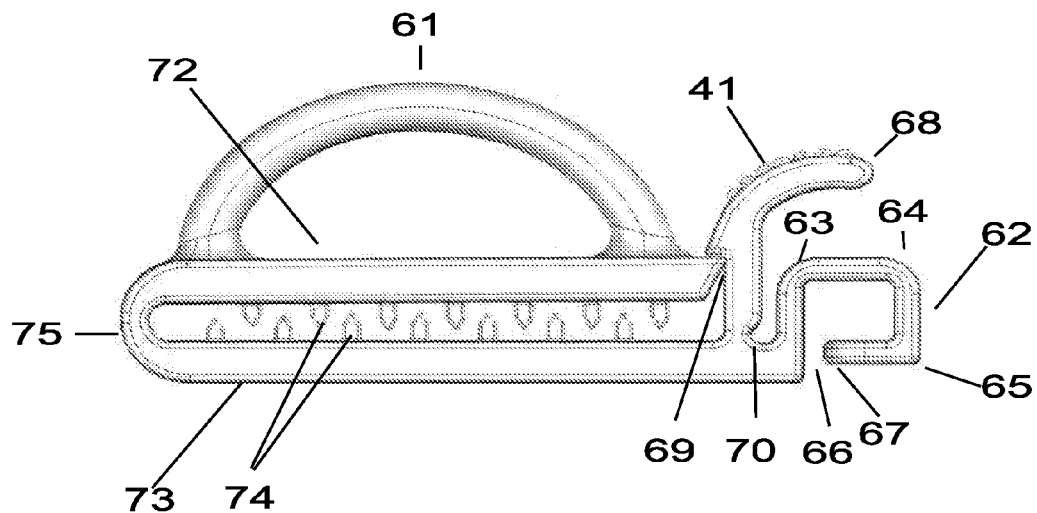
Fig 14-B

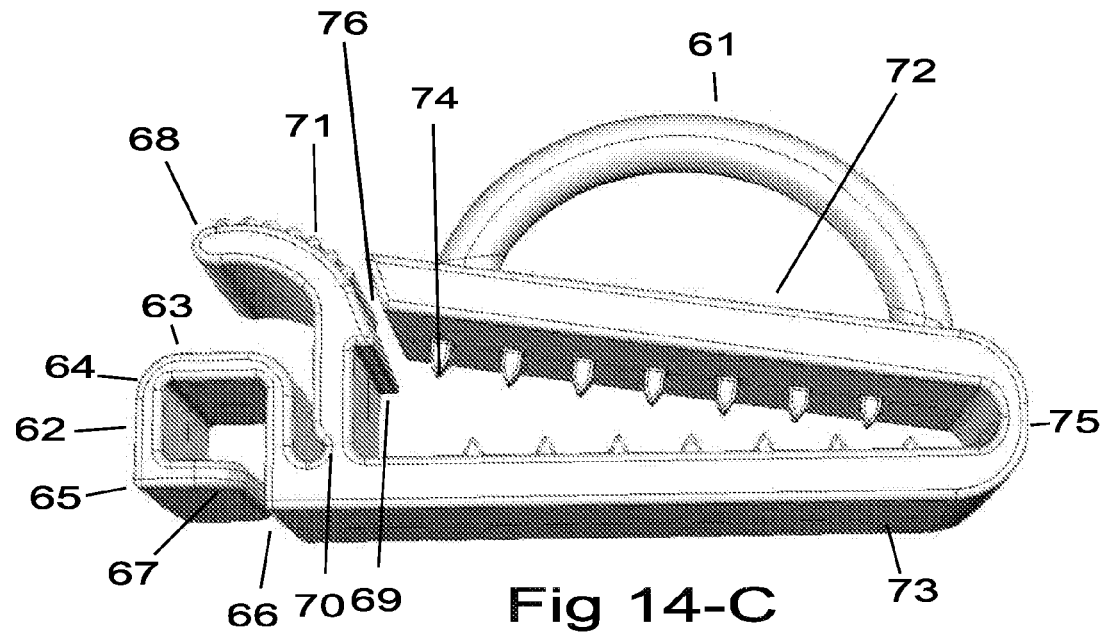
Fig 14-C
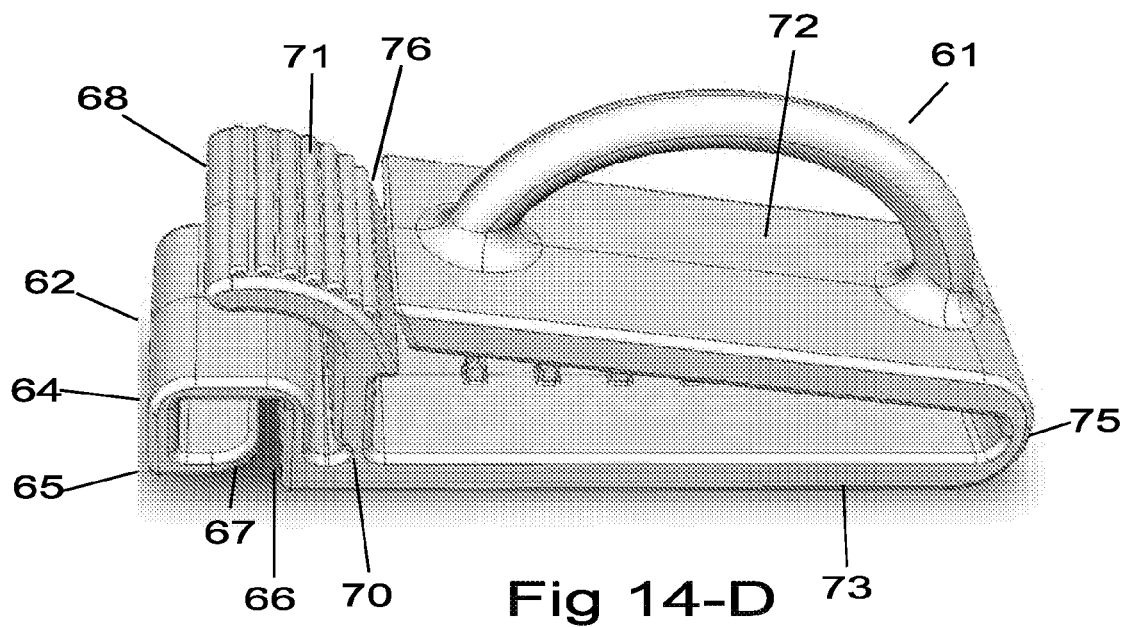
Fig 14-D

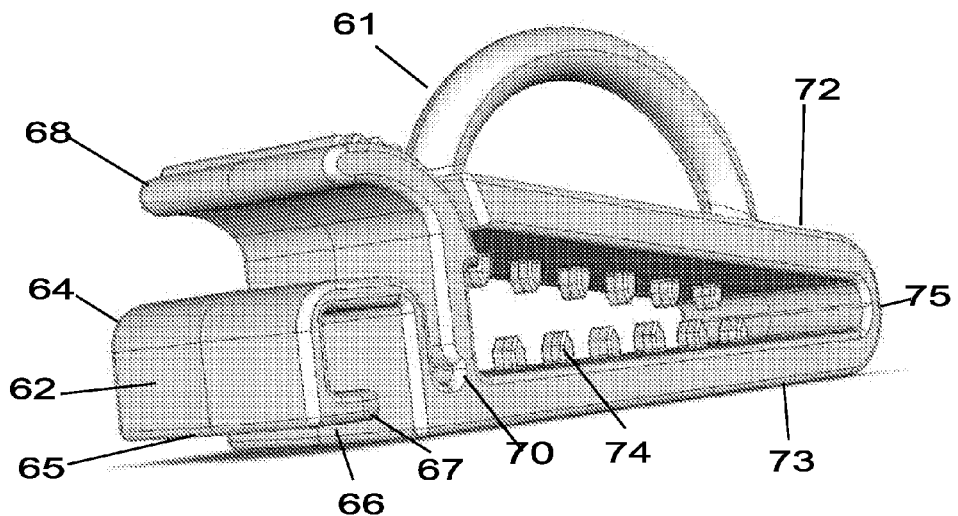
Fig 14-E
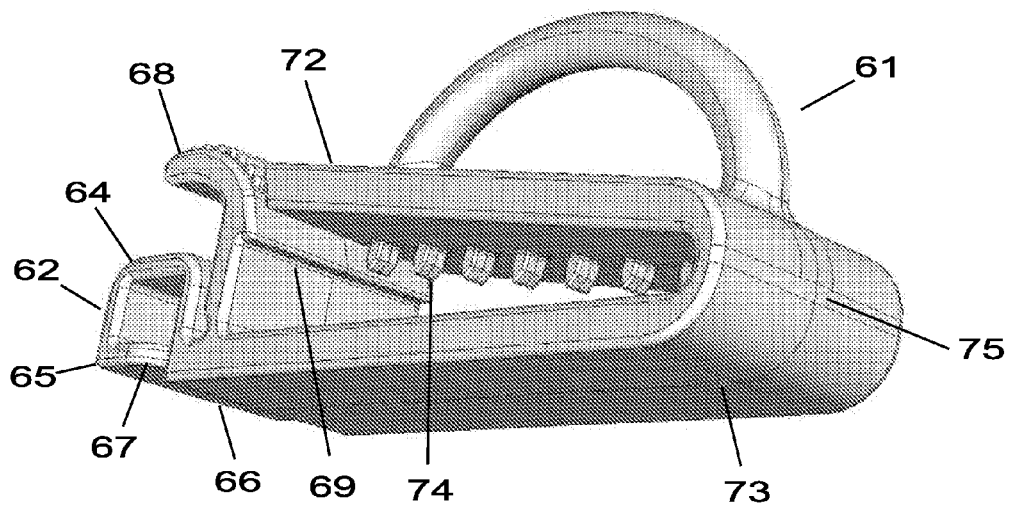
Fig 14-F

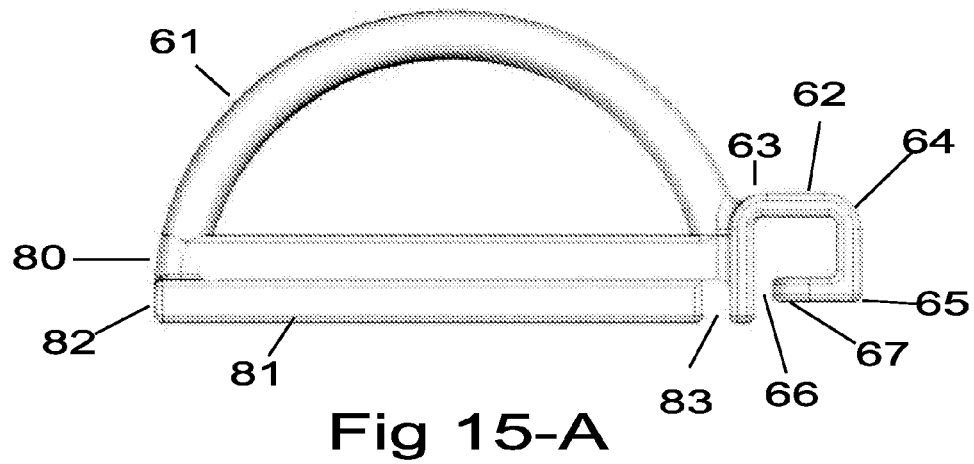
Fig 15-A
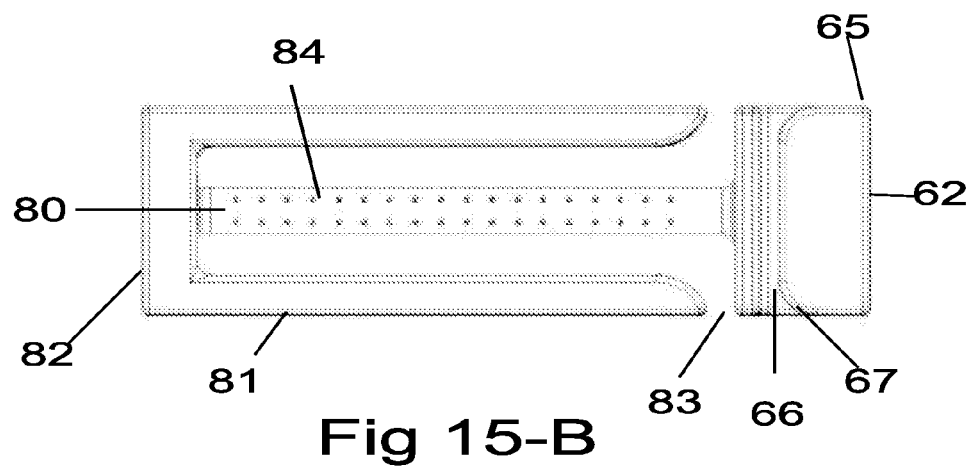
Fig 15-B
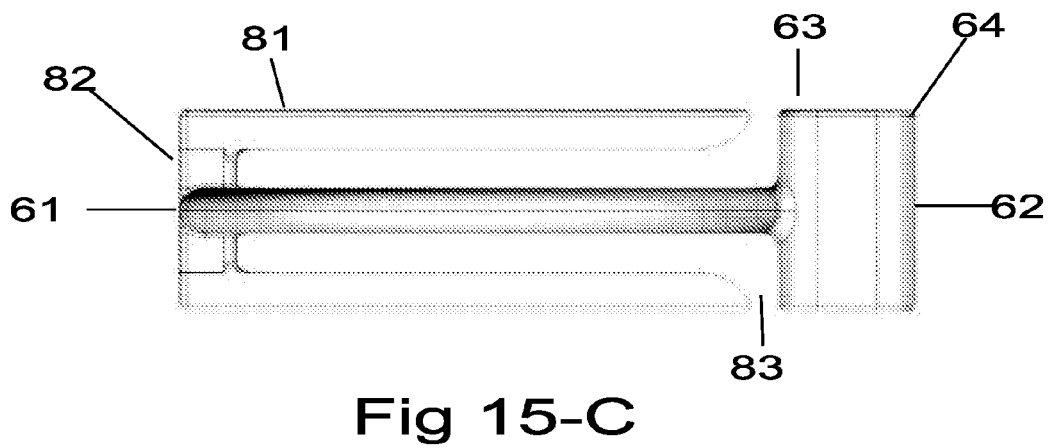
Fig 15-C

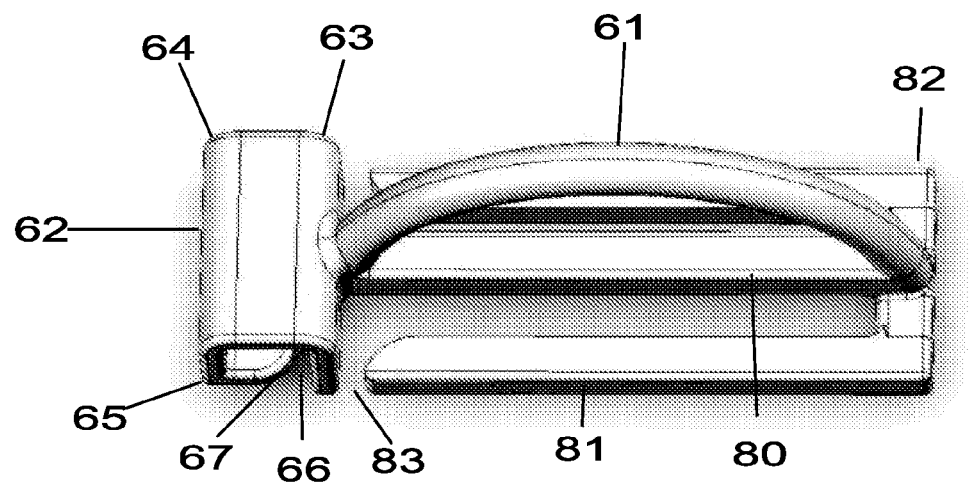
Fig 15-D
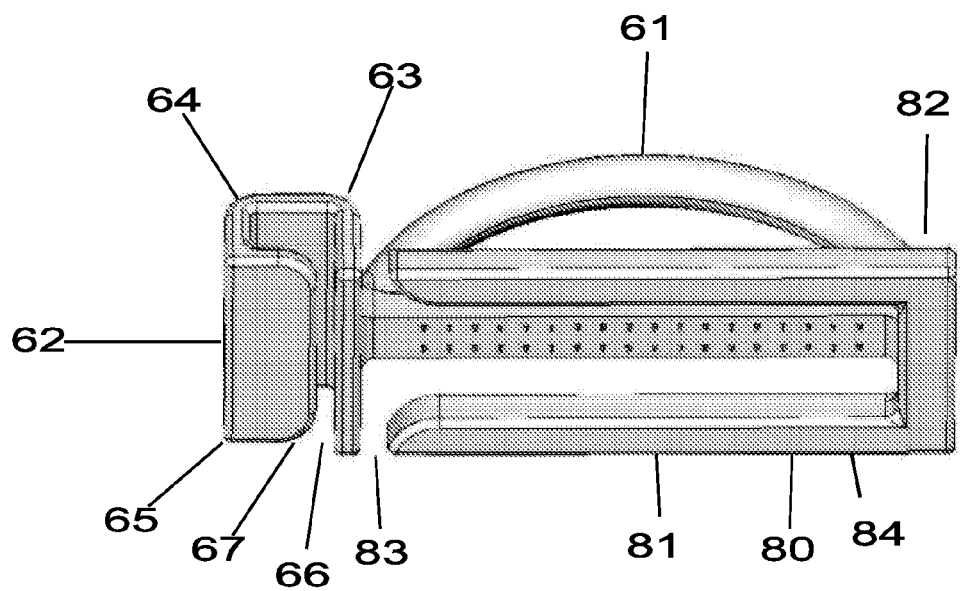
Fig 15-E

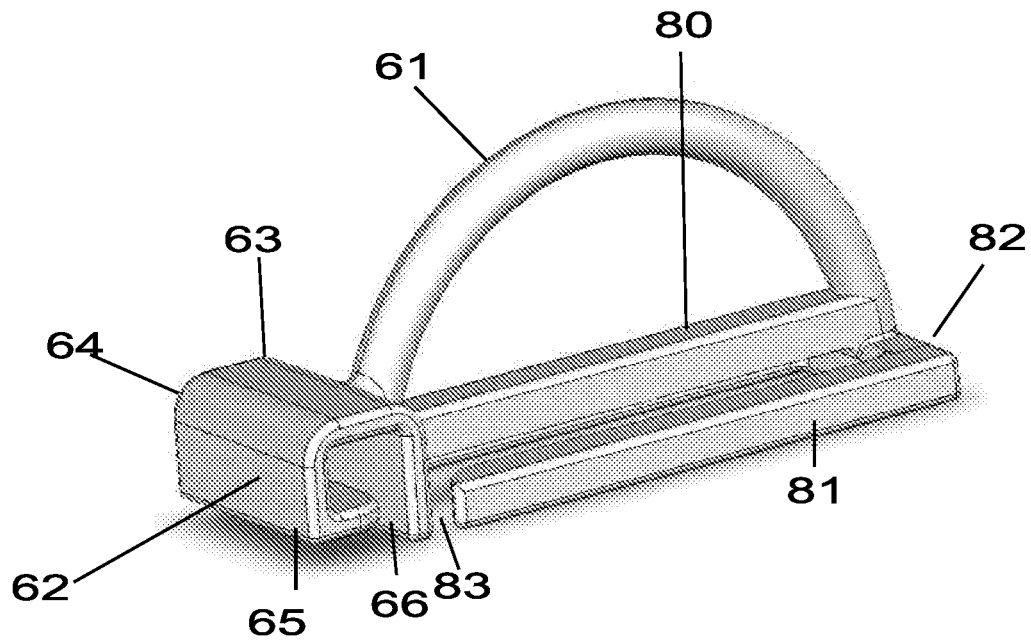
Fig 15-F
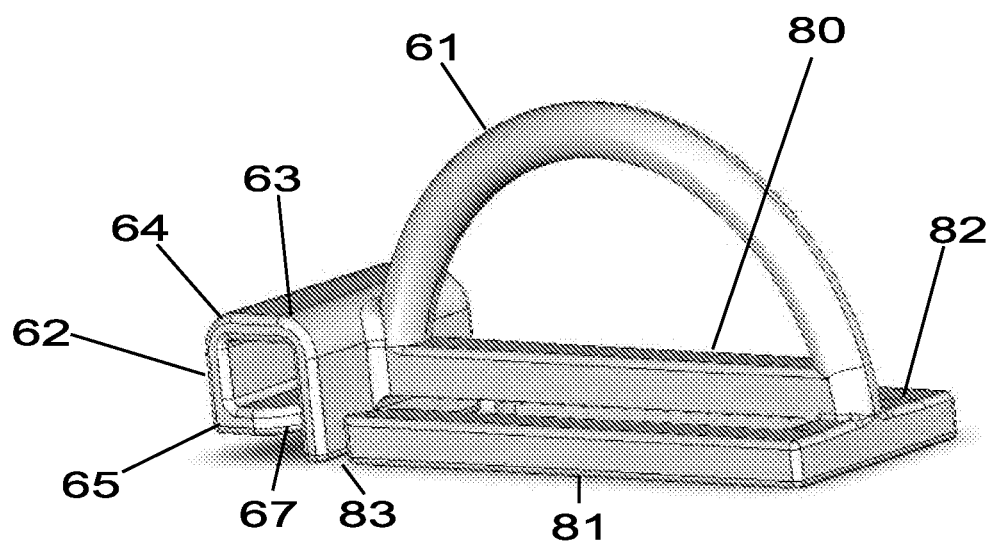
Fig 15-G

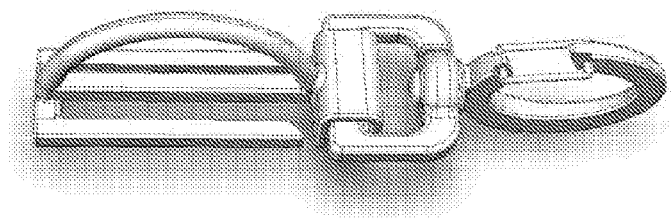
Fig 16-A
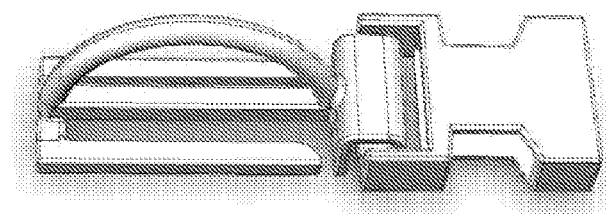
Fig 16-B
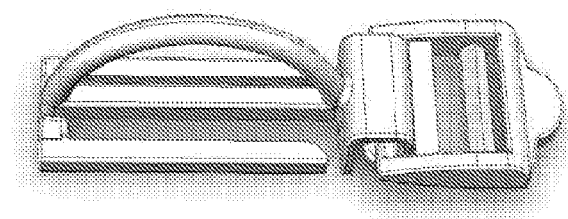
Fig 16-C
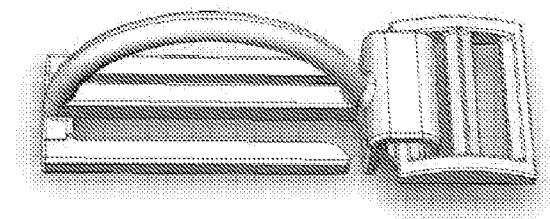
Fig 16-D
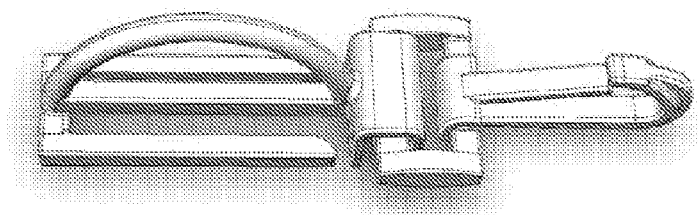
Fig 16-E

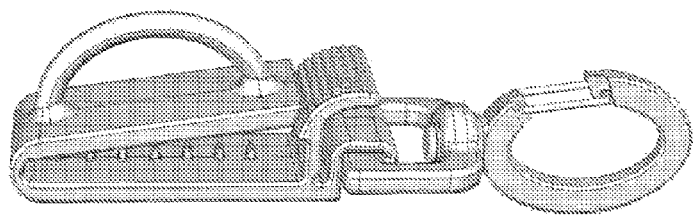
Fig 17-A
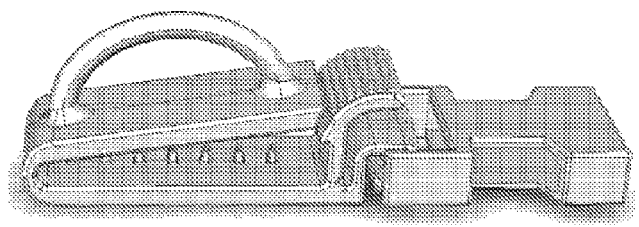
Fig 17-B
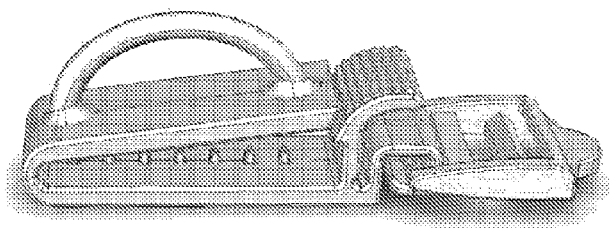
Fig 17-C
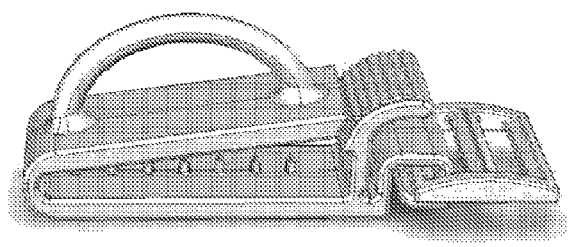
Fig 17-D
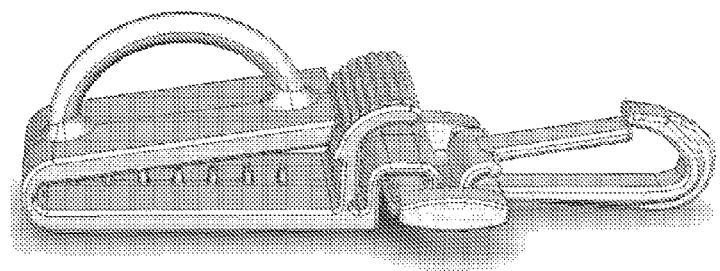
Fig 17-E

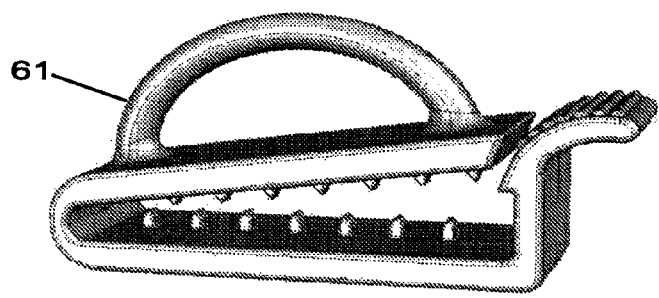
Fig 18-A
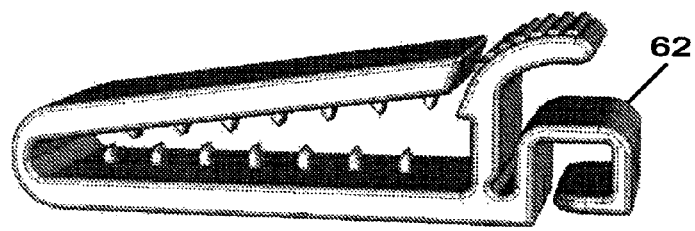
Fig 18-B
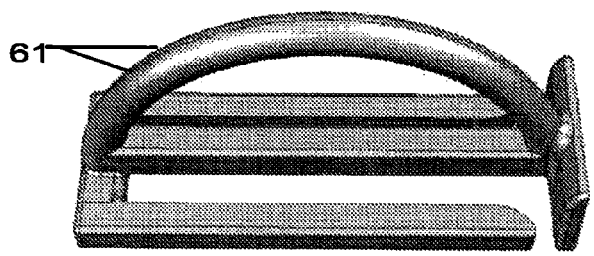
Fig 18-C
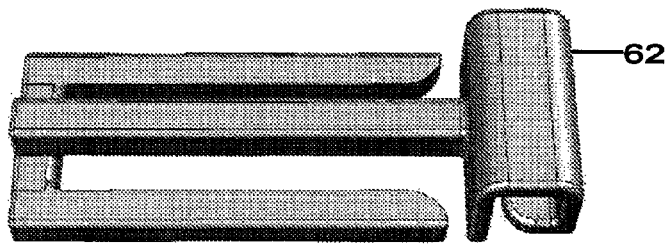
Fig 18-D

CONTAINER HOLDER WITH FASTENERS

CROSS-REFERENCE TO RELATED APPLICATIONS

This Application claims the benefit of provisional patent applications:
Ser. No. 61/088,895 filed on Aug. 14, 2008
Ser. No. 61/168,609 filed on Apr. 12, 2009
Ser. No. 61/172,798 filed on Apr. 27, 2009

FEDERALLY SPONSORED RESEARCH

None

SEQUENCE LISTING

None

BACKGROUND

1. Field of Invention

This invention relates to a holder assembly for the attachment, use, transport and deployment of containers.

2. Prior Art

This invention generally relates to the holder of containers for easy access, use, transport and deployment. It is described and illustrated in sundry uses. The choice of embodiment is dictated by the intended use. Although one example embodiment described herein shows use by scuba divers for the deployment of an additional, alternate or reserve gas supply, a multitude of alternative uses in sports, recreation and industry are also indicated. The invention incorporates several general aspects: a holder for a container, fasteners for attaching the holder to the user or a host device, and if required by the intended use, a release mechanism for partial or complete removal of the assembly from the user or host device.

One embodiment of the invention is for use as a safety device for an underwater scuba diver. Single regulators have evolved into "octopus" systems, with two second stage regulators for breathing that are connected to a single first stage which is attached to the compressed air supply. This allows two safety backup scenarios. Underwater divers are trained to dive in groups of two or more "buddies", each diver becoming the backup or support system for the other. If a diver's own second stage fails, he may switch to his own auxiliary "octo" second stage. Or if a second ("distressed") diver's gas supply fails, he may breath from the first ("safe") diver's gas container, in an emergency. Although an improvement in diver safety, this arrangement still requires a distressed diver to be within visual and swimming distance of his buddy. Unfortunately, it is not uncommon for buddies to stray farther apart than they are able to swim with a single breath. There is also a 50/50 chance that gas failure will occur after exhalation, before his next breath, severely limiting his ability to access a secondary source of gas.

The situation is further complicated by current designs which tend to place the distressed diver to the side or rear of the safe diver supplying the gas. This makes visual communication between the two divers difficult, if not impossible, at the very moment communication is needed the most. If the distressed diver goes into a state of panic, the lives of both divers may be endangered. Indeed, statistics demonstrate an alarming number of double drowning, precipitated by the distressed diver causing the additional death of the safe diver.

Most importantly, this equipment/system design is not fully redundant and applies only to second stage failure. If the failure is first stage, or an exhausted the gas supply, the "octopus" arrangement is of no use.

Background of Container Holder

U.S. Pat. No. 4,949,889 and US Pat No US2006/0175492 both show the common methods of allowing a gas container system to be used by a diver. Each shows a way of attaching the gas container, not directly to the diver, but to the diver's primary gas container. This design, or some variation of it, is one method used by divers who carry a redundant gas supply. Unfortunately, these designs have serious deficiencies that impede industry wide adoption of this important safety device, especially by those divers who are the least skilled, experienced and trained: new, novice, or "occasional" divers.

The design deficiencies of the systems shown are extensive. First, the entire weight of the system is placed on the back, adding to the considerable weight already carried there. Because it is part of the main container assembly, the added weight is much more difficult to don and remove. Alternatively, if attached to the side, (instead of on top of the main container), the distribution of weight is off-axis and similarly, off-balance/equilibrium on every axis. The off-axis weight tends to roll the diver on his side while diving. This requires the diver to change the distribution of weight on his weight system to compensate. If the safe diver deploys his gas container to a distressed diver, the faulty weight distribution remains. Similarly this design solution creates uneven drag in the water. Divers are required to compensate differently for all unequal conditions (balance, trim, drag) with or without the system attached. Failure to compensate contributes to diver fatigue and discomfort and concurrently decreases in diver safety and pleasure.

With current systems, diver discomfort begins well before the dive. Walking on land, in a rocking boat, or wading through waves while balancing the substantial additional, uneven weight on the back, creates safety hazards and pre dive fatigue. The same hazards await the fatigued diver upon his return at the end of the dive.

The design deficiencies of these patents extend throughout the dive. With a gas container attached to the main container, a longer second stage hose is required to reach around all the other gear to the diver's mouth. It presents a third regulator that can easily be confused with the non functioning "octo" that may be attached to an empty main gas container. When shared by a safe diver, the distressed diver is typically forced to the side or behind the safe diver to gain sufficient hose length. In most cases, visual communication essential to calmness and reassurance between divers is difficult or impossible. If the distressed diver demands a swift, unsafe ascent there is no way for the safe diver to separate himself. His only choice is either to terminate the distressed diver's access to his gas supply, or attempt an unsafe rapid ascent with the distressed diver. Either choice can be fatal to either diver, or both. No diver should be faced with that byproduct of deficient equipment/system design.

Some alternations have been made to these two basic designs. See U.S. Pat. No. 6,367,753; U.S. Pat. No. 7,344,11; U.S. Pat. No. 5,579,967; US 2006/0175492 A1; U.S. Pat. No. 5,271,387; and U.S. Pat. No. 4,949,889 wherein the gas container may be removed, albeit with considerable difficulty. Again, because the attachment location is on the main tank, on the back and out of sight of the diver, it is very difficult to reach by the diver encumbered by his equipment. This is highly problematic in an emergency situation. Even if eventually removed, it may not be in time. The difference between life and death can be as short as a single second. Even with successful extraction, diver imbalance/faulty trim still occurs as a result of the alternation and redistribution of weight. The claims are limited to a quick release of a secondary air supply that is attached to the "scuba main air supply tank". This location is precisely from where the instant embodiment removes the secondary air supply, for all the safety reasons identified.

U.S. Pat. No. 6,070,577 shows an alternative solution, wherein a gas container is permanently attached to the main container, but with an arrangement that makes the gas supply fully redundant (separate first and second stage regulators) for each container. While this solves design goals a) and b), it does not address the remaining c) through h). The suggested cost savings of the single air-fill feature, are negligible, compared the cost of a life ended by failure to address design issues c) through h)). Neither can this design allow for an easy onsite change of gas container size or incorporation of a second redundant gas system. The claims for this patent make no reference to the holder or the method of holding the system described to the main tank.

Not unlike the front mounted system above, U.S. Pat. No. 2,844,145 shows an early design for a primary scuba system. Like a reverse tortoise shell, the housing contains a "U" shaped container (a very difficult shape to manufacture if it is to hold gas with several thousand pounds of internal pressure), with a regulator in the middle, to be carried on the front torso. While the diving apparatus itself is unique, the holder appears to be no more that a donut shaped shell without any description as to exactly how the device is attached to the body. All three claims for this patent are limited to the "breathing apparatus" and not to any method of holding, attaching, transporting or deploying the apparatus.

U.S. Pat. No. 6,651,660 "Apparatus for Supplying Respiratory Gas to a Parachute Jumper" shows an alternative location for a diver gas container. Here the gas supply is attached to the waist on one side, or possibly lower, strapped to the thigh. While this may be suitable for a parachutist who is in the full upright vertical position, for the brief period of time he is using the device, a diver is in the water, with the device attached ready for use throughout the entire lengthy dive period which may be an hour or more. Furthermore, the diver must be able to bend at the waste, and not have additional drag or weight on one side, creating an imbalance that is fatiguing or seriously interferes with his leg kicking, the primary source of diver propulsion. The claims referencing the holder are limited to use by a parachute jumper.

Similarly, U.S. Pat. No. 2,366,455 presents a container attachment for pilots who must carry a floatation device, while flying, yet have it available upon a parachute landing in water. While this device arrangement shows two possible arrangements, one attached at the waist with a second strap around the leg above the knee, and the second, a two point attachment with the canister hanging at the mid-thigh, neither of these devices is adaptable for use underwater, containing a breathing apparatus, in the horizontal or inverted (head down) vertical position, for an hour or more, with diver legs kicking for propulsion. The two point attachment would have the device skewering its position uncontrollably. This design is suitable for the intended use, a few minutes in the air, in a vertical position, before landing on ground or water, where it is meant to be quickly removed. The claims of this patent properly limit the patent to this device being used "in combination with an airplane"

U.S. Pat. No. 7,083,361 demonstrates a new design for an "aquatic breathing apparatus comprising a buoyancy vest" designed to be a primary scuba system with fully integrated buoyancy control system, not a holder for a fully redundant secondary gas supply for the safe diver, that is fully deployable to a distressed diver in an emergency situation. In deed, one of the primary design flaws of this system, is the extreme difficulty of using a safety/gas container system with this design. The design as shown, has the single primary container located on the lower end of the buoyancy device, at waist level. It is a fully integrated system, with buoyancy control vest and gas container combined into a single, inseparable unit. The intended use of this design is as a primary gas system for scuba divers. As such it is extremely limiting. The size of the container utilized is approximately $1/6^{th}$ of the size customarily worn by scuba divers. Therefore the length of stay underwater and the depth to which the diver may descend, is severely restricted. Simultaneous use by two divers in an emergency is not possible. A redundant or backup gas supply for this primary system would necessarily be located on the back of the diver—precisely from where the instant embodiments are intended to remove it, because of the inaccessibility and reduced safety inherent in that configuration. Designed to provide "an aquatic breathing experience to a customer", its claim is not to be a deployable holder, wherein one embodiment includes the holding of a container of redundant gas supply for divers who already carry a primary source of gas and buoyancy control system. Beyond its claims as an aquatic breathing apparatus, it could serve no other purpose, such as the needs of hikers—backpackers or cyclists, who carry a container of fluids.

U.S. Pat. Nos. 5,423,586; U.S. Pat. No. 4,804,218; and U.S. Pat. No. 4,556,245, all show designs for carrying scuba containers on land, to and from a dive site. They show the greater ease of carrying these containers in a horizontal position, using a method that distributes the weight horizontally. None of these designs are intended for underwater use. They claim beneficial use for carrying on land full size scuba containers; typically 80 cu.ft. or larger, weighing 35 lbs or more. Spreading the distribution of their full weight over a wider, balance area, facilitates carrying them a considerable distance to a dive site or boat. They also show the method of use is limited to the user carrying the device in hand through the use of a handle, as opposed to attaching the device to the user, eliminating the handle and freeing the hands for other purposes.

U.S. Pat. No. 4,723,801 shows a small simple device that may be attached to a baby bottle, to allow an infant greater ease in holding his/her own bottle while drinking. While this design does show an alternative method of holding a container, the design claim is limited to a "handle that can be gripped by a baby and also be used as a teething member".

Akona is a company that sells scuba equipment and accessories. They sell a simple bag in various sizes. It is a sleeve-like device, into which a gas container of a standard size may be slipped. Velcroz straps criss-crossing over the top to keep the container inside the bag. From the bag are straps to allow it to attach and hang from the diver's side. While this may allow transference of the container to another diver, it still creates an asymmetrical problem with balance, trim and weight. Not attached to the diver by at least three points, it wags uncontrollably, depending upon the position of the diver relative to gravity. It also fails to correct the problems introduced by a third regulator and hose coming from the diver's side. Nor does is provide, as a part of the system any solution for controlling, attaching or safely placing the regulator and its hose assembly, out of the way, but readily accessible to the diver. A second gas container system cannot be attached to the first, for an additional safety margin and the container components (regulator, on/off valve, pressure gauge) cannot be instantly checked, without temporarily detaching and/or moving the system to a new visible location, often requiring use of both hands.

Zeagle is a company that sells scuba equipment and accessories. They sell the "Zeagle Air Bottle System" which is their standard gas container/valve/internal first stage and standard second stage "system" that is usable in any container size configuration. As designed and advertised the "Mesh Deploy Bag" is for the "6 cu. ft only" configuration. The design is a bag, with drawstring enclosure at one end to keep the container within. It is designed for a single container size. It has a single elastic band to contain the hose, but no attachment for the regulator end to the bag system. Through variously located holes, the assembly may be placed "in many positions with plastic ties or barrel screws" the diver might discover some way of attaching the container to his main container or buoyancy control assembly. Container deployment leaves the whole bag attached to the primary diver. It cannot be readily used by the distressed diver. As with the Akona gas bottle bag, the Zeagle container components (regulator, on/off valve, pressure gauge) cannot be instantly checked without temporarily detaching or moving the system to a new visible location, often requiring use of both hands.

This system is not a definitively designed singular system for the attachment, operation and deployment of gas cylinders, with regulators as a fully redundant, detachable system. It is an accessory, with a mired of unfinished options, requiring diver participation in the process of determining how, and by what additional means of pieces or parts (to be provided by the diver himself), the diver might discover a usable configuration.

SUMMARY OF CONTAINER HOLDER WITH FASTENERS

In the applicant's example embodiments show the holder may be made of a vast array of suitable materials, including but not limited to metal, plastic, carbon or synthetics or other suitable unknown material that functions under a variety of environmental conditions. An equally suitable embodiment may be made of soft, flexible or fabric-like materials, shaped into a cylinder holder or sleeve, with all remaining bands, straps, attachments and fasteners remaining principally the same, as dictated by the needs of the user. Each embodiment may be made of any suitable material that provides sufficient strength and internal pressure resistance to secure the cylinder within the holder, and straps, bands and fasteners necessary to utilize the respective embodiments as dictated by the intended use.

The instant embodiment demonstrates a method to overcome this safety deficiency with a holder system for the attachment, use and deployment of a fully redundant gas supply and regulator system. The design goals for a redundant gas supply and holder system are; a) to attach, ready for immediate emergency use, a fully redundant gas supply of sufficient duration to overcome a gas emergency, b) make the arrangement of the system instantly and easily used by the either the safe or distressed diver, c) position the divers for face to face visual communication, d) allow the distressed diver to ascend independently with the emergency gas supply, freeing the safe diver from endangerment caused by the distressed diver, e) throughout the diving experience, both with the gas container attached in a non emergency and after deployment to a distressed diver, the safe diver remains in neutral balance and trim without any shift in weight distribution, f) the weight distribution of the utilized holder system is balanced both in and out of the water as compared to current redundant/gas container system, g) adaptability of the holder to different standardized container sizes and, h) adaptability for the attachment of additional gas containers.

Goal "a" has largely been met by the diving equipment industry. Small compressed gas containers, with between 6 and 19 cu. ft, (and some larger) that allow attachment of standard regulators are commercially available. However, adoption and use of these safety systems by sport and recreational divers has been largely ignored. The principle reasons for this non-adoption is the lack of solutions for design goals; b) through h). Sport and recreational divers comprise the vast majority of underwater divers, worldwide, including dive related fatalities and injury. That majority of the market, have the least experience. They require a system of simplicity, ease of use and reliability if they are to adopt it universally.

The creation of a container holder system design, that successfully addresses and resolves the goals of b) through h) hereinabove, is one important safety creating use of the various embodiments shown hereinbelow.

Not unlike skydivers, whose fully redundant parachute system, is located on the front torso to the "diver", ready for instant emergency use, so too is the instant embodiment.

Feature 1: The holder, whether made of hard or soft material, retains the container in a horizontal position, across the front torso of the user.

Feature 2: Adjustable fasteners attach to suitably located points on the diver's harness, which customarily hold the diver's main gas supply on his back, as well as his buoyancy control device and other accessories. These fasteners primarily hold the weight of the container holder system in and out of water.

Feature 3: Additional sets of fasteners, which employ some form of quick release buckle are attached from the holder to the diver's waistline belt. This secures the container holder system against the torso and minimizes its mobility in any direction; horizontal, sideways or even upside down.

Feature 4: Attached to the compressed gas container is a regulator system to allow the diver to breath the gas. In the event of an emergency, the diver may immediately remove the regulator from the holder container to access the gas during his ascent to safety. In the event a distressed diver needs the gas, he approaches the safe diver directly from the front and places the regulator in his mouth. Once the emergency situation is stabilized, both divers may surface either together or separately.

Feature 5: If required or desired by the safe diver, he my fully deploy the entire system onto the distress diver to effect a complete separation. This is accomplished by first giving the regulator to the distress diver for his use, then detaching the release the buckles between the holder and the waistline belt, then detaching the upper fasteners from the harness. Thereafter the entire assembly may be quickly and easily attached to any D-ring or suitable attachment point on the distressed diver, thus allowing his separate, hands free ascent to safety.

Insofar as I am aware, no device formerly developed provides a complete, fully designed solution to all the design parameters stated hereinabove. The container holder is simple, effective, flexible and adaptive, while simultaneously increasing safety and ease of use and reducing opportunities for functional failure.

Background of Fasteners

One design feature common to all embodiments is the quick and easy deployment and adjustment of the entire system on the primary user as well as its easy deployment to a secondary user, especially in a state of emergency. This design goal is accomplished through the simplified system of attachment and adjustment of the straps or webbing coming from snaps, hooks, bolts, clips, adjusters, slides, glides, rings or buckles and other devices of similar purpose, which in turn attached the holder to the user.

A common way of attaching equipment and accessories is by the use of a snap, hook, bolt, clip, adjuster, slide, glides, rings or buckle and other adjusters for straps, webbing or harnesses [hereinafter "snap device"]. Examples uses of snap device include (but are not limited to) backpacks for hikers, buoyancy packs and weight belts for scuba divers, safety harnesses for mountain climbers, tool harnesses for construction workers, to name but a few of the most recognizable application situations.

A common use of the snap device is to attach a rope, strap or webbing or to attach a piece of equipment to the user or "host device" (defined as: any device or object, other than the user), such as scuba containers to divers, back packs to hikers, parachutes to skydivers, tarps to most anything to be covered, and as well as any other purpose, for which strapping or webbing needs to be attached, through a snap device to the user of any host device An equally common use of the snap device is to attach useful accessories such as knives, tools, floats, lights, clipboards, etc to the user. The small accessories that users carry to facilitate their tasks or increase their safety and enjoyment are as important as the primary purpose of the holder.

This alternate use of the snap device assembly requires the easy adjustment of the strap by the user as to length and level of security of the attachment needed for the tools, accessories or devices. Commonly the ancillary devices used for this function employ the use of slide buckles, strap adjusters or similar devices (hereinafter "adjusters"). The type of adjuster used is usually dictated by the size, flexibility and thickness of the strap or webbing and how easily/quickly the device must be adjusted or made permanently secure.

Regardless of the type of adjuster used, the strap must be attached to the user's snap device, if it is to be secured to the host device. It is that point of attachment of the strap to the snap device that current designs have inherent limitations of ease of use, security, durability and permanence of adjustment.

The goal is to reduce the number of "connection points" between the accessory, tool or device and the snap device to which it must be attached. The fewer number of connection points, or additional pieces needed to accomplish the task of securing a strap to a snap device, the fewer possibilities of failure, deployment difficulty and the lower the cost.

The applicant's invention incorporates several alternative fastener embodiments (hereinafter: fasteners "A" and fastener "B") for attaching the container holder assembly to the user. Each design incorporates a different set of design goals to address a multiple set of needs.

Background of Fastener "A"

Fastener "A" shows a variety of embodiments that may be made of any material, suitable to the intended purpose of the user and are able operate under a variety of environmental conditions. A suitable material would provide sufficient strength and friction to secure the strapping or webbing within the strap adjuster component of the snap device.

Current snap device designs commonly employ a single "eye" through which the strap is thread. This "eye" is commonly "U" shaped rather than flat or rectangular like the (top half) of an "H" shape. The single space "U" shape bunches the webbing up at the bottom of the "U", creates concentrated points of pressure and wear, which shortens the life span of the webbing. To reduce web wear and tear, distribution of the load/pressure, at the point the strap passes through the eye of the snap device, must be evenly (flatly) distributed across the full operating surface width of the strap.

The greater the number and size of surfaces or areas of contact between the strapping and the material that comprises the structure forming the eye of the snap device, the greater the strength of the connection between both components (strap and snap device). By dividing the total workload/pressure over a plurality of surfaces, (i.e. "multiple eyes") reduces the pressure/stress on each individual area, increasing overall reliability and resistance to wear and tear.

Simply stated, a commonly designed "single-eyed" fastener assumes 100% of the workload of attaching the webbing to the fastener, in a concentrated area at the bottom of the "U" shaped eye. The flat, "plural-eyed" instant design not only distributes the workload across the full width of the strap and the eye, it further divides the workload between the multiple eyes. By way of example: a triple eye would distribute one third the "load" between each "eye", reducing by two thirds the "eye" workload of a single eyed fastener. Depending upon threading configuration, a plurality of eye configurations can allow for multiple folds of the strap, through the eyes, reducing the pressure upon each individual "eye" and increasing proportionally, the frictional area needed for secure attachment.

The applicant's example embodiments overcome the deficiencies common in "single U shaped eye" designs, that are made more complex by their requirement of a separate device to adjust and secure the web to the snap device. The common arrangement is more difficult and less reliably secure. In contrast, the instant embodiments utilize a single combination unit wherein the strap adjuster is fully integrated into the snap device. As a single unit, the instant embodiments: a) allow the threading of the strap onto the snap device, without disassembly; b) allow easy post-threading adjustment; c) while the harness remains in use and; c) eliminates the extra separate strap adjuster to complete the attachment/adjustment process.

Most fastener designs are variations on U.S. Pat. No. 499,615 by Ernest Walker. This consists of a "shank", an extension to which is shaped into a "hook" and a lower "eye" portion through which rope or strap may be attached. This patent states the eye may also "swivel" on the shank. US 2005/0138781 A1 improved upon this "wherein a check member is situated in the movable bolt of the bolt snap retaining body to provide for the open and closed states of the retaining body via the actuation member". The modification allows for the automatic opening of the shank, by rotating the bolt, relative to the ring (or whatever device to which it is attached). This patent does not address any portion of the snap device point of attachment to the strap or web.

U.S. Pat. No. 872,691 is an adjustable swivel snap for use with specially adapted watches that again makes no reference to the "strap" belt or web attachment portion of the snap design. Similarly U.S. Pat. No. 4,731,910 creates a new design for the "hook/snap/buckle" portion of the design, but relies on the original slide design of attaching the strap or web to the "hooking mechanism".

The "Snap Ring Connector" U.S. Pat. No. 4,894,944 offers a new design for connecting the "connector" to a "host device" but makes no changes to how a strap or web is attached at the other end.

U.S. Pat. No. 6,530,131 B1 is a Tool Leash Device, that uses a Trigger Snap and Carbinger for attachment to various devices. Between them is a spring that uses a split ring as a connective device. However, if the "connector" were to require straps or webbing, the new design provides no new solution for connection. Strap adjusters would still be required, if the straps were not cut and permanently sewn to the exact length required.

U.S. D571,059 S installs a "shock absorber, between the dog snap and the point of attachment to the "lease". Yet again no provision in the design allows for the direct attachment and adjustment of the strap to the snap device, without the use of a separate strap adjuster.

U.S. Pat. No. 5,852,988 shows the use of multiple spring slide bolts, that are on swivel eyes, that allow for the attachment of multiple "dog leashes", and by use of the swivel design, the leashes will not twist and tangle. But here again, the point at which the lease is attached to the actual spring slide bolts, the design shows the requirement that the strap be permanently sewn to the slide bolt. There is no provision for the adjustment of the strap length, without the use of a separate strap adjuster.

Similarly, U.S. Pat. No. 4,879,972 shows permanent, non adjustable attachment of the straps to the slide bolts. Security System U.S. Pat. No. 4,638,764 shows the use of "D-Rings" permanently attached to the strap to allow for strap adjustment, but without any provision for a snap device to attach to a "host device" such as webbing, or a harness worn by the user.

Alternatively, U.S. Pat. No. 4,525,901 which is called "Buckle having improved web securement" shows a "double-eye" in a very specific configuration, with "an upper wall being formed with molded teeth or serrations and angled or oblique wall forming acute angle at rounded corner". The patent incorporates a specific design, that is more suitable for plastic molding and would be more problematic for manufacture with metal, because of the "acute angles" and "teeth" that must be employed to make up for the fact the "adjuster" portion of the device incorporates only two eyes. This may be a suitable design for buckles, where the pressures on the device may be accommodated by a plastic device. Where the stresses require metal, the design offers far less security of attachment, is more problematic and costly to manufacture and prone to slippage. A "double-eye" provides only two "folds of the web". The "teeth" required by this design created excessive wear as they must necessarily cut into the webbing. Whereas, the applicant's plurality of "three eyes or more", is not only much simpler to manufacture it does not require "acute angles" or "teeth", is easily made with metal, allows four or more "folds of the web", which in turn reduces proportionally the load seen by each "cross bar". It also eliminates all "acute angles" or "teeth". No. 4,525,901 is a web buckle and is not designed to incorporate into a spring snap, hook, slide bolt or any alternative snap device.

U.S. Pat. No. 5,216,786 "Plastic buckle and method of forming" is limited to plastic, performs the function of adjusting the strap, but makes nor provision for or incorporation into a snap device, or other device of similar purpose and design.

Numerous variations on these design themes exist yet, at the point of attachment to a strap or webbing, they commonly use the same curved "U" shaped "single space" eye, and rely on a separate adjuster device to create the security of attachment and ability to make adjustment. The applicant's embodiment incorporates all requisite elements into a single design component that is simpler, stronger, more reliable, easier to implement and more cost effective to manufacturer.

Summary of Fastener "A"

The applicant's example embodiment has multiple features that systematically overcome the numerous deficiencies/limitations of other designs meant for similar application. As described and illustrated in various embodiments, no embodiment demonstrates superiority. The various embodiments are shown in sundry uses. The choice of embodiment and the material from which it is manufactured, is dictated by the intended use.

Feature 1: The eye of the snap device is not curved, but straight, to match the most suitable operating shape for a strap. This means the load sustained by the strap/webbing in use, will be evenly distributed across the full width of the strap, not just concentrated in the center portion. This reduces wear and strain on the strap web material, increases longevity and reliability, ease of use and increased safety.

Feature 2: The plurality of eyes of the snap device is preferably increased to three or more, but no less than two. The increase in number and size of the surfaces of contact between the strap and the snap device eyes decreases the pressure per square centimeter. This design feature nets a substantial increase in the longevity of the material, reliability and ease of use.

Feature 3: The plurality of eyes creates all the design features of a strap adjuster, within the design parameters of the snap device itself. Applicant's incorporation of the adjuster component into the design of the device, simplifies ease of use, increases the security of attachment and reduces the number of additional pieces needed to create a device that both secures and allows for the adjustment of strapping to a snap device. The net benefit of this feature is increased ease of use and reliability.

The applicant's example embodiment provides the features, applicability and stability of a snap device with the adjustability of a strap adjuster. Insofar as I am aware, no device formerly developed provides a complete, fully designed solution to all the design parameters stated hereinabove. Fastener "A" is simple, effective, flexible, scalable and adaptive, while simultaneously increasing safety and ease of use and reducing opportunities for functional failure.

Background of Fastener "B"

A common method of attachment to a harness or webbing is by the use of a D-Ring which extends from the webbing, upon which a fastener or snap device may be attached. Made from either plastic or metal, the D-Ring commonly requires some level of disassembly of the harness to install. The D-ring is normally thread by the webbing from an open end of the plate of the ring. In some instances, the installation of this D-ring alone may require extensive time to disassemble and reassemble the harness and its other attachment points. Adjustability after installation or during use may also be problematic.

If proper deployment of the accessory requires a release system, other than what will attach to a D-ring, then a series of intermediary connection devices and points is commonly required. This may include a split ring, to a short web, to a side release or center release buckle; or a split ring or slide bolt type buckle, connected to a lanyard, which may then be connected to the desired quick release buckle. Carbingers connected to rings, short webbing and then release buckle is another option. These are some, but not all of the complicated solutions that may be required to accomplish something very basic: attach a device, accessory or tool to a harness.

The applicant's example embodiment overcomes these deficiencies in unnecessary complexity and lack of ease of use. The instant embodiment includes a single fastener that: a) can be easily installed anywhere on the harness, without disassembly; b) has its own "quick release" to allow easy adjustment and relocation; c) while the harness remains in use; d) has an integral D-Ring for traditional attachment, and e) a newly created "G-Ring", that allows for the direct attachment of various fasteners by f) eliminating the intermediary webbing/ring/buckle "connection points" commonly required by other designs.

Fastener "B" overcomes the design deficiencies of the standard D-ring. First, the invention provides for the installation of the D-Ring without any disassembly of the harness. It then adds the G-Ring for the simultaneous direct connection to the harness, of a vast array of commercially available fasteners in addition to the direct attachment and adjustment of other straps or webbing.

Fastener "B" may be made of any material, suitable to the intended purpose. A suitable material would provide properties that are both strong, nearly rigid, but with enough flexibility to allow the device to open and close, and operate under a variety of environmental conditions Most designs that approximate the invention are variations on a basic design for holding a ring of keys to a user's belt. They consist of an oval or upside down "U"-shaped clip that fits over the users belt, followed by a second clip or other "U" shape, into which the ring that holds the keys is placed. Sometimes the "ring holding section" has a latch or cover that prevents the ring of keys from dislodging. This concept is exemplified in various ways by: U.S. Pat. No. 4,113,156; U.S. D479,907 S.

Other prior designs, which are equally limited to holding a ring, use the folded back metal material of the clip itself, to retain the ring, as in U.S. Pat. No. 2,775,804; U.S. Pat. No. 1,206,074; No. D415,343; D523,237 S; No D46,019 and No D473,710.

The problem that remains with this design, is that it is limited to attaching a "ring" (usually a split ring), onto which keys or other devices must hang, in order for them to be attached to the belt/webbing or harness. Not all devices attach readily to a split ring. Many require some other intermediary connecting device to be attached to the "ring", which can finally be attached to the belt clip.

Other variations on this theme include belt clips for very specific tasks, such as attaching a cell phone or pager as in U.S. Pat. No. 6,065,563 for attaching a "stethoscope"; U.S. Pat. No. 4,949,432 for attaching an "eyeglass holder"; U.S. Pat. No. 4,667,374 for attaching a "gun holster"; U.S. Pat. No. 4,699,303 for attaching "Golf Articles"; U.S. Pat. No. 4,771, 927 for attaching "cordless phone"; or U.S. Pat. No. 6,062, 449 for "Tool Belt Tool Tote".

Here the limitations are equally obvious. Each belt clip has but a single function; to attached a single type (or even more limited "model" or "make") of a device. Every device needs a different design of belt clip. This is an inefficient and costly solution to the need to attached a variety of devices to a user.

Developments in materials have allowed for the creation of a vast array of snap devices and other types of fasteners. Examples of these include U.S. Pat. No. D434,971, "Revolving Hook"; No. D 348,385 "Swivel Snap Hook"; No. D 354,433, "Snaphook"; U.S. Pat. No. 343,862 "Snap Hook"; No D 496,251 S "Hook Attachment Device"; U.S. Pat. No. 6,460,232 B2, "Side Release Buckle"; and U.S. Pat. No. 5,791,026 "Side Release Buckle". A look at the vast ITW Nexus and Waterbury Hardware Catalog, demonstrates the variety of designs and the tasks they are meant to facilitate.

Scores of variations on these design themes exist yet, at the point of attachment to a harness, belt, or webbing, they commonly require an intermediary connection device such as short pieces of webbing, split rings, snap devices and/or carbingers, to make the final attachment to the harness.

This arrangement is costly, complex and prone to failure, as each is a "link", with the weakest determining the maximum strength of the entire "chain"

There is one other variation on this theme, as exemplified in U.S. Pat. No. 5,333,361 "Keeper Clip". Here the device must be twisted to allow for the interlocking of each half of the device, that slips over the belt. An obvious weakness in this design, is the fatigue of the material with each twist. User discomfort, as he twists the material, is another deficiency in this design.

All the of the devices share one benefit, when compared to a D-Ring assembly. The can be installed on the belt or harness, without disassembly.

However, with all the above (non D-Ring) designs, another serious deficiency remains. With movement by the user, the clips will not remain securely in one place on the harness. They will tend to move along the belt with use, absent the use of yet another device to hold them securely in place. They may even slide off or dislodge all together, separating the user from his accessory or device.

Summary of Fastener "B"

The fastener "B" has multiple design features that systematically overcome the design deficiencies/limitations of other designs meant for similar application.

Installation: All "D-Rings" must attach to their host web, harness or belt. Unlike designs which must be fed onto the belt from one end [often requiring disassembly, and reassembly], the invention easily slips over the harness in similar fashion to the "key ring holder", but with an important set of feature differences.

Feature 1: The inside surfaces of the fastener interface with the belt/harness/web, have teeth, that will grip the host material and control the movement of the device, along the length of the harness/belt/web. This means the attached tools or devices will remain in one location for ease of use and increased safety.

Feature 2: With modest pressure, the fastener will secure onto the harness. This is accomplished one of two methods, depending upon the embodiment employed ("B1" or "B2"). Fastener "B1" is secured by the user pressing down on the "thumb latch", which moves the thumb latch lip backward. With the clam shell top and bottom halves open, the webbing may either be thread from the side of the fastener, between the teeth, or fed through the open space between the thumb latch and upper clam shell. Once the webbing is in place, the upper clam shell is depressed sufficiently to securely slip it under the thumb latch lip.

Fastener "B2" accomplishes a similar task, by feeding the webbing through the outer finger access point, over the two outer fingers, and under the center strut. Upward pressure of the webbing against the teeth located on the under surface of the center strut will minimize the movement of the fastener across the length of the host web, or user belt. For removal, simply reverse the steps described hereinabove.

Feature 3: To adjust, remove or relocate the B1 embodiment, the user simply presses the thumb latch in a downward/backward motion, which will release the clip from the webbing. The "thumb latch" design is superior to that of the "Keeper Clip" (U.S. Pat. No. 5,333,361), which has the same intent, but is far more problematic and discomforting to the user and is more prone to material fatigue and failure.

Combined, features 1-3 of fastener "B" provide the features, applications and stability of a "D-Ring", but with the simplicity of installation, adjustment of a "Belt Clip".

Feature 4: Adds to the design a simple, but highly effective "G-Ring". Located just beyond the open "belt" end of the clip and its "thumb latch" (B1) or the outer finger access point (B2), the G-Ring functions as a direct universal attachment point for any appropriately sized ancillary fastener such as a hook, latch, snap device, strap adjuster, fastener or other device that uses webbing, as an intermediary connection to an ancillary fastener such as a carbinger, split ring, or other connecting device that will secure it to the harness, by use of the "D-Ring".

The "G-Ring" allows the direct attachment of the webbing side of the ancillary fastener, without the use of the webbing. This eliminates the intermediary devices traditionally needed to connect to a D-Ring.

Feature 5: By eliminating intermediary connecting points and devices, between the fastener and the belt/harness, that would otherwise require D-Ring use, the D-Ring component of the invention is now available for devices that are optimally designed for attachment to a D-Ring.

Feature 6: With the direct attachment of a standard strap adjuster, webbing at an alternative angle may be connected directly to the host harness and still be fully adjustable. Previously the webbing would feed through the adjuster, then a clip or snap device, that is attached to a D-Ring. Fastener "B" eliminates the extra snap device, yet retains all the advantages of an adjustable attachment.

Simply stated: the features 4-6 of fastener "B" eliminate the complexity, difficulty of use, and increased risk of failure created by the multiple connection points that are commonly used to connect an ancillary fastener to a harness. Fastener "B" accomplishes this by facilitating the direct connection of the "ancillary fastener" to the harness. It also frees the "D-Ring" that is incorporated into the design, for use by devices that are best attached via a "D-Ring".

Feature 7: Both the "G-Ring" and the "D-Ring" may be used simultaneously, side by side, doubling the number of available points of attachment, while vastly increasing the variety, scope and breath of ancillary fasteners that may be efficiently utilized.

In the embodiment shown in applicant's example of its use by scuba divers, the lower strap of the container holder is connected to fastener "B" through the use and direct attachment of an ITW, Nexus Fastex SR-1 side release buckle U.S. Pat. Nos. 450,464, 4,171,555. The combination of direct attachment of the SR-1 to fastener "B" allows for the instant release of the holder from its lower attachment points by simply squeezing the sides of the SR-1, as it is designed.

In conclusion, insofar as I am aware, no device formerly developed provides a complete, fully designed solution to all the design parameters stated hereinabove. Fastener "B" in its various embodiments is a simple, effective, flexible, scalable and adaptive, while simultaneously increasing safety and ease of use and reducing opportunities for functional failure.

SUMMARY OF THE INVENTION

In a first aspect, the present invention provides a holder for a container of predetermined circumference and length that retains said container within, using a plurality of attachment points that communicate with a plurality of fasteners, each at predetermined locations whereby said container is retained within said holder to allow its direct, stationary, horizontal to the user, attachment and detachment to any host device, belt or harness system.

In one embodiment, said material of the holder is semi-rigid to provide pressure sufficient to retain said container within said holder, as provided by a separating space, whereby the holder will maintain pressure against the container.

Preferably, the holder comprises a plurality of bands of retaining material, where the container is cylindrical and which bands comprise elastic material to encircle the circumference of the container, whereby said elastic material produces a constant source of contracting pressure against said holder and said container such that the pressure is sufficient to retain said container within said holder.

A plurality of eye brackets may be provided to communicate with a plurality of straps through bolts that communicate with holder band eye brackets, whereby said holder will allow direct attachment and detachment to any host device, belt or harness system.

Preferably. the plurality of straps communicate with a fastener. More preferably. the communication of each of the plurality of straps with fasteners is by threading through a single non-mechanical component consisting of a series of spaces, separated by cross bars to provide for the securing and adjustment of the strap relative to the fastener.

Each of the plurality of straps may communicate with a release buckle comprised of a plurality of separable components. whereby said release buckle, when released, remains in communication with the user through mutual communication of a fastener and the fastener remains with the holder through mutual communication of the strap.

Said material of the holder is preferably flexible, synthetic or natural fabric-like material, to provide pressure sufficient to retain said container within said holder whereby said container is retained with in said holder to allow its direct, stationary, horizontal to the user, attachment and detachment to any host device, belt or harness system.

The material of the holder may have a plurality of bands encircling the holder to provide pressure to retain said container within said holder, more preferably a plurality of straps communicate with said plurality of bands.

Most preferably, each of the plurality of straps communicate with a fastener by threading through a single non-mechanical component consisting of a series of spaces, separated by cross bars to provide for the securing and adjustment of the strap relative to the fastener.

Each of the plurality of straps may communicate with a release buckle comprised of a plurality of separable components, more preferably one separable component of the release buckle communicates with a fastener. which communicates with a user.

In another embodiment, at least one of the plurality of fasteners is comprised of components that allow direct stationary, horizontal to the user, attachment and detachment to any host device, belt or harness system, more preferably one component of at least one of the plurality of fasteners provides for the attachment of the fastener to the user.

A second component of at least one of the plurality of fasteners may be a single, non-mechanical component that is:
 (a) comprised of a plurality of rectangular spaces;
 (b) separated by a plurality of cross bar members; and
 (c) through which said straps are thread through said spaces, between and around said cross bar members to communicate and adjust said straps relative to said fastener.

In a still further embodiment, at least one of the plurality of fasteners comprises a strap or web that is thread through a lap and bottom clam shell that articulates between an open and closed position, whereby said strap or web will retain its interior position within the clamshell whether open or closed.

More preferably, the top and bottom clam shell contains a predetermined number of teeth of predetermined width that:
 (a) control the strap relative to the fastener when closed; and
 (b) release the strap when open. and retain the interior position of the strap relative to the clam shell.

More preferably, said strap or web is threaded between three cross bar members, of a single non-mechanical component, in the following manner: over the outer cross bar members and under the center cross bar member, which contains a predetermined number of teeth of predetermined width.

In other embodiment, the at least one of the plurality of fasteners incorporates a component that approximates the shape of a half circle that protrudes from the rest of the fastener at a predetermined angle to provide a point of communication with snap devices.

At least one of the plurality of fasteners may incorporate a rectangular shaped element that is partially opened on one side across its full width and extends from the fastener at a predetermined angle, to provide a point of communication with snap devices. buckles, adjusters, connectors, cords, lines or tubes.

Said strap or web may be threaded between three cross bar members, of a single non-mechanical component, in the following manner: under the outer cross bar members which contains a predetermined number of teeth of predetermined width and over the center cross bar member.

The open end of the outer cross bar members may be disposed to communicate with the end of the center cross bar member when closed.

At least one of the plurality of fasteners may incorporate a circular shaped element that protrudes from the rest of the fastener at a predetermined angle to provide a point of communication with snap or clip devices.

At least one of the plurality of fasteners may incorporate a circular shaped element that is partially opened on one side across its full width and extends from the rest of the fastener at a predetermined angle. to provide a point of communication with snap devices, buckles, adjusters, connectors, cords, lines or tubes.

Summary of Container Holder with Fasteners

In the applicant's example of one embodiment, and in accordance with each alternative embodiments of the container holder, fasteners "A" and "B", the applicant provides a quantum improvement in the design of holders and fasteners for attaching, using and deploying containers and/or other accessories, that is simple, inexpensive and easy to use.

In the applicant's example of one embodiment, by overcoming all the design inhibitions that have dissuaded scuba divers from adopting a fully redundant air supply as their standard safety system and procedure, this applicant's embodiments open the door for the entire scuba diving industry to adopt full redundancy as the preferred method of backup up gas supply safety, which will substantially increase the safety record of the industry, and potentially save hundreds of lives.

Furthermore, the design embodiments of the container holder and fasteners allows for a variety of cylinder sizes to be attached in a variety of positions, for a variety of uses. It allows a large number of operational design benefits using an array of example embodiments of the holder.

The alternative uses of this container holder system are many. Examples include hikers, campers and backpackers, who need to carry drinking fluids, may carry a greater quantity of fluid in a larger container using the invention as opposed to, and especially wherein, they might already be carrying a substantial weight on their backs.

Cyclists traveling at high speeds may benefit from the invention, by carrying their drinking fluids across the front torso, with a tube fed directly to the mouth, rather than on the bike or their back, which requires the use of one hand to access (and one less on the bike for direction and balance).

Landscapers and the like, who dispense fluids on the job site, might better work with both hands free, utilizing the invention, as opposed to carrying their required containers in one hand, and their operational tools in another.

Similarly, it is well understood that it is structurally easier for humans to carry more weight that is evenly balanced (right/left, front/back) than it is to carry less weight unevenly distributed.

The applicant's embodiments, all demonstrate a substantial solution to the problem of weight load imbalance, whether it be for carrying gas or fluids.

In conclusion, insofar as I am aware, no device formerly developed provides a complete, fully designed solution to all the design parameters stated hereinabove. The applicant's container holder system is simple, effective, flexible, scalable and adaptive, while simultaneously increasing safety and ease of use and reducing opportunities for functional failure.

BRIEF DESCRIPTION OF THE DRAWINGS

Figures

FIG. 1-A: Hard Holder Embodiment A with Container—shows one embodiment of the container holder with a container inserted within the holder. A plurality to attachments for fasteners "A" (36) and "B" (37, 38) are made to the container holder (31), wherein fasteners "A" (36) extend away from the holder and fastener "B" (37, 38) extends in the opposite direction, but similarly attached to the container holder on the side opposite fastener "A" (36). The fastener straps (35), thread through and connect fastener "A" (36) to the strap bolt (40), that is fed through the holder band eye bracket (31), that is held in place by the strap bolt open head (41) and the strap bolt nut (42). The selected embodiment of fasteners "B" (38) is attached directly to the female half of a release buckle (39). The male half of said buckle is connected through the fastener straps (35) the strap bolt (40), open head (41) and nut (42) and eye bracket (31) of the container holder. All fasteners together comprise a system to retain the container within the holder for its intended purpose. The holder is comprised of rings, separated by a connector bar (44). The rings that encase the container either may or may not employ an expansion cut (43). The container is held in place by friction between the holder and the container. The degree of friction employed is determined in part by the materials of which the holder and container are made. To enhance the degree of friction, an inner band (43) of suitable material may be sandwiched between the container and holder. An additional band (33) of suitable material may be employed external to the holder, to add inward pressure of the holder against the container.

FIG. 1-B: Hard Holder Embodiment A without Container—shows FIG. 1-A, but with the container removed. Also shows the "inner bands" (34) sandwiched between the container holder and the container.

FIG. 1-C: Hard Holder Embodiment A (Side View) with Fasteners "A" (36) and "B2" (38) shows the same embodiment as FIG. 1-A but with an alternative embodiment of fastener "B" (38).

FIG. 1-D Hard Holder Embodiment A (Side View) with Fasteners "A" (36) and "B1" (37) show the same embodiment as FIG. 1-A but with an alternative embodiment of fastener "B" (38).

FIGS. 1-E (Front View) and FIG. 1-F (Rear View): shows FIG. 1-A with Fasteners "A" and "B1" with the orientation indicated by the direction of the fasteners (36 and 37) and the expansion cuts (43).

FIGS. 1-G (Front View) and FIG. 1-H (Rear View): shows FIG. 1-A with Fasteners "A" and "B2", without a Connector Bar and with the orientation indicated by the direction of the fasteners (36 and 38) and the expansion cuts (43).

FIGS. 2-A-D shows the hard holder from all directions (top, bottom, front, side, respectively), with all bands and attachments removed FIGS. 2-E shows the hard holder alternative embodiment with the connector bar excluded.

FIGS. 3A-B shows hard holder isometric views of the holder, with all attachments removed. The side with the "expansion slot" (43) is the back side of the device.

FIG. 4-A: shows detail of the threading of the fastener strap (35) through the attachment point on fastener "A" (36), the strap bolts (40) and eye brackets (31).

FIGS. 4B-C shows hard holder embodiments "A" and "B" respectively, with fasteners "B1" (37) and "B2" (38) attached respectively to the release buckles (39), which are in turn attached to the container holder.

FIG. 5-A shows detail of fastener "A" (36), the threading of the fastener straps (35) through (36) and its attachment to the strap bolt (40) within the hard holder eye bracket (31). Also shown is the strap bolt open head (41), nut (42), the outer retaining bands (33), inner retaining band (34) running along the outer and inner sides respectively, of the holder.

FIGS. 5-B-C shows the detail of the fastener strap (35), threading into the male side of the release buckle (45), which is inserted into the female side of the release buckle (46), which is attached to fasteners "B1" (37) and "B2" (38), respectively.

FIGS. 6-A-C show the threading of the fastener strap (35) around the strap bolt (40), which has an open head (41) at one end and a nut (42) threaded on the opposite end.

FIGS. 7-A and 7-D show the release buckle, in exploded, isometric views.

FIGS. 7-B-C shows the release buckle, with the male half inserted into the female half, side and top views, respectively FIGS. 7-E-F shows the release buckle with the male half removed from the female half, side and top views, respectively.

FIGS. 8-A and 8-B show the holder with alternative embodiments (B & C). FIG. 8-A shows an embodiment which incorporates the outer retaining bands (33) and the inner retaining bands (34). Embodiment "C" (FIG. 8-B) shows the holder with the outer retaining bands (33), but with the inner retaining bands excluded. This alternative embodiment may be utilized in those situations where the degree of friction between the holder and the container, as a product of the materials use in both, are suitable for the intended purpose.

FIG. 9-A shows Embodiment "D" as a "soft holder" that employs the same fasteners as embodiment "A" (FIG. 1-A) except the holder is created with flexible materials and or fabrics. This figure shows a flexible sleeve (47) made of any suitable material, around which the faster straps (35) are attached. The outer retaining bands (33) encircle the sleeve at any appropriate point parallel to the retaining straps (35). This embodiment, as with those that follow through FIGS. 9-11, are more suitable to uses where overall weight is a consideration, the lightest possible configuration is desired, or the container is of a predetermined length and size that the location of the fastener strips is to be determined by said dimensions and center of gravity of the container.

FIGS. 10-A & B shows Embodiment "D" with the container inserted within the holder/sleeve, and without, respectively.

FIGS. 10-C & D shows Embodiment "E", which is the same as Embodiment "D", but without outer retaining bands (33).

FIGS. 10-E & F shows Embodiment "F", with the container (10-E) and outer retaining band (33), which is the same as Embodiment "D" but without the sleeve (FIG. 10-F).

FIGS. 10-G & H shows Embodiment "G" is the same as embodiment "F", but without outer retainer bands. This is suitable where the goal is the lightest and or most economical configuration possible, using material for the fastener straps that is sufficiently strong and flexible to support a modest container weight.

FIGS. 10-I, J, K & L show embodiments in similar configurations to FIGS. 10-E, F, G & H, but with the inclusion of a "connector band" (48) between the fastener straps (35).

FIGS. 11-A thru D show several additional alternate embodiments, as viewed from the top, with the "connector bar" (48) included (FIG. 11-A & C) and excluded (FIGS. 11-B & D), and/or with the outer retaining bands (33) included (FIGS. 11-A & B) or excluded (FIGS. 11-D & D).

FIGS. 12-A thru C shows one embodiment of fastener "A" wherein the cross bars (55) are rounded in formation and the point of articulation (52) between the upper component (51) and the lower component strap adjuster (53) is rotational.

FIGS. 12-D thru F shows an alternate embodiment of fastener "A" were the cross bars (55) are rectangular in formation.

FIGS. 13-A thru G are, examples of additional alternative embodiments wherein the upper component (51) can be any variety of snap device, bolt, buckle or hook and, at the point of articulation (52) with the lower component strap adjuster (53) is either rotational (FIGS. 13-A, B, D, E & F), or it may be fixed (FIG. 13-C) or it may be swinging (FIG. 13-G). Said alternative embodiments are not presented as a limitation in the application of the lower component strap adjuster (53) to an upper component (51) but as an example of the variety of combinations of upper and lower components that can be realized, as well as the types of articulations between the components.

FIGS. 14-A & 14-B show one embodiment of fastener B1 in the open and closed position, respectively. The webbing onto which fastener "B" will be attached, may be thread from either direction, i.e.; while the device is in the open position, as shows in FIG. 14-A. Said webbing may be thread from the sides, passing directly between the top and bottom halves of the clam shell (72 & 73). Alternatively, it may be thread through the space between top clam shell (72) and the thumb latch (68) at the clam shell access point (76). Both FIGS. 14-A and 14-B show the D-Ring (61) arching above and attached at either end of the clam shell top (42), extending from the back end flex point (75) to the front of the clam shell top (72). These figures also show the shape of the G-Ring (62) as well as all "flex" points (63, 64, 65) and "access" points (66). It shows the thumb latch (68), its "flex point" (70), and its "lip" (69) under which the top clam shell (72) is inserted upon closure, relative to the "clam shell" bottom (73). The teeth (74) are also shown, overlapping in the closed position (FIG. 14-B) and not overlapping in the open position (FIG. 14-A), to allow for the insertion of the webbing onto which it will be closed and secured.

FIGS. 14-C thru F show the fastener B1 in isometric views.

FIGS. 15-A thru C shows alternative fastener B2 from the side, bottom and top views, respectively. The relationship and purpose of both the "D-Ring" (61) and the "G-Ring" (62) is identical to FIGS. 14-A thru F, hereinabove. The alternative embodiment incorporates a modified method of creating pressure upon the webbing by the device. In this embodiment, the webbing may again be "thread" through the device, by alternative means. One method of insertion of the webbing is to thread it from the side, over the top of the "outer finger"

(81), extending under the "center strut" (80), emerging on the other side to extend over the top of the opposite "outer finger" (81). Alternatively the webbing may be inserted through the outer finger insertion point (83) which is the space between each out finger (81) and the "G-Ring" (62). As tension is drawn upon the webbing, it presses against the under side of the "center strut" (80), wherein rows of small teeth will minimize movement of the webbing, relative to the fastener.

FIGS. 15-D thru G show fastener B2 in isometric views.

FIGS. 16-A thru E show alternative embodiments fastener B2, wherein a variety of snap devices, strap adjusters and buckles are attached directly to the B2 fastener, rather than through the use of intermediary webbing.

FIGS. 17-A thru E shows alternative embodiments fastener B2, wherein a variety of bolts, snaps, hooks, buckles and strap adjusters and buckles are attached directly to the B2 fastener, rather than through the use of intermediary webbing.

FIG. 18-A is alternative embodiment of fastener B1 without a G-Ring (62)

FIG. 18-B is alternative embodiment of fastener B1 without a D-Ring (61)

FIG. 18-C is alternative embodiment of fastener B2 without a G-Ring (62)

FIG. 18-D is alternative embodiment of fastener B2 without a D-Ring (61)

| DRAWINGS - Reference Numerals | |
|---|---|
| 31 | Hard Holder Band Eye Bracket |
| 32 | Soft Holder |
| 33 | Outer Retaining Bands |
| 34 | Inner Retaining Bands |
| 35 | Fastener Straps |
| 36 | Fastener A |
| 37 | Fastener B1 |
| 38 | Fastener B2 |
| 39 | Release Buckle Male & Female |
| 40 | Strap Bolt |
| 41 | Strap Bolt Open Head |
| 42 | Strap Bolt Nut |
| 43 | Expansion Cut |
| 44 | Connector Bar |
| 45 | Release Buckle Male |
| 46 | Release Buckle Female |
| 47 | Sleeve |
| 48 | Connector Band |
| 51 | Snap/Clip/Bolt Assembly |
| 52 | Point of Articulation |
| 53 | Strap Connector Adjuster |
| 54 | Spaces Strap Insertion |
| 55 | Cross Bar Strap Retention |
| 61 | D-Ring |
| 62 | G-Ring |
| 63 | G-Ring Flex Point 1 |
| 64 | G-Ring Flex Point 2 |
| 65 | G-Ring Flex Point 3 |
| 66 | G-Ring Access Point |
| 67 | G-Ring Access Point Corner |
| 68 | Thumb Latch |
| 69 | Thumb Latch Lip |
| 70 | Thumb Latch Flex Point |
| 71 | Thumb Latch Ridges |
| 72 | Clam Shell Top |
| 73 | Clam Shell Bottom |
| 74 | Teeth |
| 75 | Back End Flex Point |
| 76 | Clam Shell Access Point |

DETAILED DESCRIPTION

Container Holder Hard Embodiment—[FIGS. 1-A thru 8-B]

In the following description, certain terms will be used for brevity, clarity, and understanding, but no unnecessary limitations are to be implied therefrom beyond the requirements of the prior art, because such words are used for description purposes herein and are intended to be broadly construed. Furthermore, the embodiments of the system illustrated and described herein are by way of example, and the scope of the invention is not limited to the exact details of construction and use. Many other variations are possible with the teachings of the various embodiments.

One embodiment of the container holder is illustrated in FIGS. 1-A thru 8-B. FIGS. 2-A thru 3-B show the holder as a single structure comprised of a connecting bar (44) at the opposite ends of which are solid but flexible holder band eye brackets (31). The bands encircle the container they hold, FIG. 1-A. Depending upon the materials used to create the holder and the material of the container, the interior surface of the holder bands may be coated or of a coarse texture to create sufficient friction to retain the container within the holder; FIG. 8-B. In the alternative, such as shown in instant embodiment FIGS. 1-B and 8-A, inner retaining bands (34) may be sandwiched between the holder band and the container to create sufficient friction and pressure to retain the container within the holder. To allow for adjustments in the diameter of the container and additional or variable thickness of the inner retaining bands (34), the holder bands may be cross cut at one location on each band (43) to allow for contraction and expansion of the bands and or container. In order to create additional contracting pressure of the holder bands around and against the container, an outer retaining band (33) may be attached around the outer circumference of the holder bands. In certain applications, the bands may be used as additional attachment points for hoses or other devices connected to the container. A connector bar (44) may, or it may not be utilized (FIG. 2-E), to communicate with or predetermine the distance between the holder bands (31), as predetermined by the dimensions of the container it is intended to hold.

Attachment of the holder to a host device or user is by the use of multiple fasteners. A plurality of fasteners (36, 37, 38) are incorporated to attach and control the mobility of the holder and container. Although a variety of fasteners may be used, depending upon the intended use and design of the host device or attachment points on the user, the embodiment shown in FIGS. 1-A and B by way of example, shows alternative embodiments of fasteners: fastener "A" (36) and fastener "B2" (37). Alternatively, FIG. 1-D shows fasteners "A" (36) and B1 (37).

FIG. 5-A and FIGS. 6-A thru C show in detail how fasteners "A" (36) are connected to the holder by a flexible fastener strap (35). The strap is looped at the point of attachment to the holder around the strap bolt (40), which is inserted between the eye brackets (31) and held in place by the strap bold open head (41) and strap bolt nut (42). At the opposite end of the strap, connecting fastener "A" (36) to the container holder, the strap is fed directly on to the strap adjuster (53) component of fastener "A" (36). This is accomplished FIGS. 12-A thru F by threading the fastener strap (35) through the spaces (54) and over the cross bars (55) of each strap adjuster (53) component of each fastener "A" (36)

Fasteners "B1" (37) or "B2" (38), when utilized, are similarly attached to the container holder (31) as fastener "A" (36), with one modification. Inserted between the fastener strap (35) and the fastener "B1" (37) or "B2" (38) is a release buckle (39). FIGS. 5-B & C detail the method of attachment between the fastener strap (35) and the respective fastener. The strap (35) is thread at the appropriate location of the release buckle male component (45), which is inserted into the release buckle female (46) component, to which either fastener "B1" or "B2" is connected.

FIGS. 7A thru 7F detail the release buckle male (45) and female (46) components in both the connected and disconnected configuration.

Operation: Container Holder Hard Embodiment—[FIGS. 1-A Thru 8-B]

One manner of using the hard embodiment, by way of example only, is for the use of holding a container of backup gas for emergency use by a scuba diver, or to assist a distress diver who has lost access to his own main gas supply.

In this example, the diver would install a container of compressed gas within the holder. The containers are available in various sizes, typically for this application: 13 c.ft. or 19 c.ft. The first stage of a gas delivery regulator is attached to the on/of valve of the container. A small pressure gauge may also be attached to allow the diver to monitor the internal gas pressure of the container. Located properly, this gauge may be read by the diver/user, while the holder is attached and in use. A hose connects the first stage to the second stage regulator/ mouthpiece from which the diver may breath. Said hose would be coiled and inserted between the outer retaining bands (34) bands and the holder band (31) encircling the container. The second stage regulator and mouthpiece may be attached to the holder, via a mouthpiece holder, attached to a split ring, fed through the strap bolt open head (41)

In this example application, the holder would be situated on the front torso of the diver. Fasteners "A" (36) would be attached to commonly found "D-rings" on the buoyancy control vest worn by the diver. The elevation of the holder relative to the user's torso, would be adjusted by straps that are threaded through strap adjuster (53) component of the fastener "A". If the diver is in a vertical position, Fasteners "B" would extend from below the holder, connected via the fastener strap (35), through the quick release buckle (39). Which ever is used, fasteners "B1" or "B2" would connect, by straddling waistline belt of the buoyancy control vest of the diver, at locations separated by a distance approximately equal to the length of the connector bar (44).

Because of the plurality of attachment points, the holder and container remain in a relatively fixed location on the torso of the diver, regardless of his orientation relative to gravity. With the holder located in front of the diver, emergency use greatly is simplified compared to traditional systems of redundant gas deployment. In the event of loss of gas, the diver simply pulls the second stage regulator from the outer bands and inserts into his mouth, and begins a safe ascent. In the event a distressed diver requires use of the gas supply, the same process is used to hand the regulator to the distress diver, who would be located directly in front. The regulator hose would automatically extend by pulling it from under the outer retaining bands (33). Once stabilized, the safe diver has the option of removing the gas container and holder system, and deploying it on the distressed diver, to allow his unencumbered ascent. This is accomplished by first squeezing the release buckles (39) to free the lower portion of the holder. Thereafter the safe diver disengages fasteners "A" from his own "D-ring" attachment points to allow their attachment of the holder/container system to the distressed diver. Fasteners "B" remain with the safe diver as they are not needed by the distressed diver, whose immediate intent would be to surface in the vertical position.

DETAILED DESCRIPTION

Soft Embodiment [FIGS. 9-A thru 11-D]

A group of alternative embodiment of the container holder is illustrated in FIGS. 9-A thru 11-D. FIG. 9-A shows one embodiment, that incorporates fastener straps (35) that attach to either end and encircle a connecting sleeve, (47) that may be made of flexible synthetic or fabric-like material. If required to create additional contracting pressure around the container, outer retaining bands (33) may be employed around the outer circumference of the sleeve (47). In certain applications, the bands may be used as additional attachment points for hoses or other devices connected to the container. The length of the sleeve and the distance between the stretch bands is predetermined by the dimensions of the container the holder is intended to hold.

Attachment of the holder to a host device or user is by the use of a plurality of fasteners, similar to the hard embodiment described hereinabove, and illustrated in FIGS. 1 thru 8-A. Therein a plurality of fasteners is used to attach and control the mobility of the holder and container relative to the user or host.

Furthermore, based upon the soft embodiment configuration, a variety of alternative embodiments are conceived, the suitability of which is determined by the intended application.

By way of example, FIGS. 10-C & D shows the soft embodiment without the use of the outer retaining bands. Alternatively, FIGS. 10-E & F shows the soft embodiment with the outer retaining bands (33), but without the sleeve. Alternatively, FIGS. 10-G & H show the soft embodiment incorporating use of the fastener bands (35) only, eliminating both the outer retaining bands (33) and the sleeve (47).

Additional alternative embodiments are shown in FIGS. 11-A and C wherein a connector band (48) is utilized in embodiments using outer retaining bands FIG. 11-A and do not FIG. 11-C.

Operation: Soft Embodiment FIGS. 9-A Thru 11-D

The manner of using the alternate embodiments, by way of example only, may be for holding a container of refreshment fluids for a hiker, back packer, climber or cyclist.

The beneficial attributes of the soft embodiment are many and include light weight, low manufacturing cost and compressibility of size for storage or transport, while retaining all the functional attributes of the hard embodiment.

One example application of the soft embodiment is the backpacker or hiker where drinking fluids that add considerable weight to the backpackers load carrying requirements. Carrying the fluids, hands free in the area of the front torso, where it is more readily accessed would offer better distribution of the total carrying weight. Reduced weight together with its superior distribution increases hiker safety, as does increased control of the container mobility while climbing or traversing spaces that place the hiker in positions other that upright. Cyclists would receive similar benefits from the soft embodiments, where drinking fluids may be easily configured from the torso, with hands free use and instant accessibility, as opposed to "one armed cycling" while accessing and drinking from a container attached to the cycle.

The instant soft embodiment provides all these attributes, including a highly compact, and storable configuration when not it use.

Because of the plurality of attachment points and options, the holder and container is fixable in a variety of locations suitable to the user for his intended purpose.

DETAILED DESCRIPTION

Fastener "A" [FIGS. 12-A thru 13-G]

In the following description, certain terms will be used for brevity, clarity, and understanding, but no unnecessary limitations are to be implied therefrom beyond the requirements of the prior art, because such words are used for description purposes herein and are intended to be broadly construed. Furthermore, the embodiments of the system illustrated and described herein are by way of example, and the scope of the invention is not limited to the exact details of construction and use. Many other variations are possible with the teachings of the various embodiments.

Each embodiment of fastener "A" is comprised of connecting components (51, 53) and a point of free or limited articulation (52) between them. The snap/clip/hook/bolt assembly (51) is connected to the strap connector adjuster (53), through a variety of articulation types (52) as determined by the intended use or application. Similarly, the materials of which each component is made are determined by the intended use and are not limited to metals, plastics, carbons, synthetics or any other suitable material. The materials chosen for each element may, but need not be, the same. Each may be chosen for the specific qualities required by the intended use.

The first aspect of fastener "A" is the snap/clip/hook/bolt assembly (51) is commonly the point of attachment to a user or host device. This assembly may be any appropriate design, as dictated by the intended use. Types commonly used, by way of example and without limitation include, slide bolts, spring clips, pin clips and butterfly snaps The instant embodiment incorporates the use of a "butterfly slide bolt" (51).

The second aspect of fastener "A" is the strap connector adjuster (53), wherein a flexible strap may be attached. The spaces (54) of the strap connector adjuster (53) are rectangular, as created by the straightness of the cross bars (55). A flexible strap is attached FIGS. 4-A and 5-A by threading it through the spaces (54) and over and or under the cross bars (55), The shape of the cross bars (55) and remaining structure of the strap connector adjuster (53) may be anything suitable to the task, included circular FIGS. 12-A thru C or rectangular FIGS. 12-D thru F or any other shaped desired.

Customarily, the spaces (54) would be large enough to accommodate a double passing of the webbing or strap. The straight cross bar (55) and rectangular shape of the space (54) distributes the strap load across the full width of each cross bar (55). This decreases wear and slippage, increases durability and security of the attachment The third aspect of fastener "A" is the point of articulation (52) between the snap/clip/hook/bolt assembly (51) and the strap connector adjuster (53). Said articulation may be pivotal/rotational FIGS. 13-A, B, D, E, swingable FIG. 13-G, or fixed FIG. 13-C, as dictated by the intended use of the device. Operation: Fastener "A" [FIGS. 12-A Thru 13-G]

The following manner of using fastener "A" is by way of example only, with no intended limitation.

Fastener "A" increases reliability and simplicity of use wherever a strap or web must be attached to a snap, clip, hook or bolt. The design decreases wear and tear on the strap or webbing to which it is attached. It increases the ease and security of the attachment and adjustment of the strap to the snap, clip, hook or bolt. It eliminates the purchase and use of a separate strap adjuster.

Fasteners of this typed include but are not limited to snap devices that terminate on the "strap" end with a "U" shaped point of attachment, often called an "eye". In the event the material attached is a rope, this "eye" may be satisfactory. But where the material to be attached is flat, i.e.; a strap or webbing, the webbing becomes bunched at the bottom of the "U" shape. The bunching up of the material increases the rate of wear and likelihood of failure. This occurs in part because the surface pressure of the strap material upon the snap device is not evenly distributed. This not only increase wear and decreases reliability, it also requires the use of a second device, a "strap adjuster" to secure and adjust the strap relative to the snap device and prevent its slippage, mal-adjustment or release. The strap adjuster is a separate, second device that is required by the deficiency of common fastener design. It requires additional cost to the use, is more complex to use and more prone to mal-adjustment and slippage.

Operation of the instant embodiment demonstrates the superiority of the applicant's design. The design of the fastener, at the point of its attachment to the strap, is optimized for the wear and stress loads of the strap or webbing in all the following ways.

First, by assuring the strap distributes its load evenly over the entire surface of the fastener, the pressure per square inch is significantly reduced. Wear is distributed evenly across all surfaces.

Secondly, by distributing the load over three or more cross bar (55) surfaces, the load per square inch is reduced proportionally. In contrast, where the strap adjuster is separate from the snap device, said adjuster cannot carry any of the load of the strap or help transfer that load directly to the snap device. In this common arrangement, its work is limited to adjustment and not to transferring the load from the strap to the snap device. Wherein, fastener "A", the material strength of the strap adjuster works not only to adjust the strap length, but also to transfer the entire strap load directly to the fastener.

DETAILED DESCRIPTION

Fastener "B1" [FIGS. 14-A thru F]

In the following description of fasteners "B1" and "B2", certain terms will be used for brevity, clarity, and understanding, but no unnecessary limitations are to be implied therefrom beyond the requirements of the prior art, because such words are used for description purposes herein and are intended to be broadly construed. Furthermore, the embodiments of the system illustrated and described herein are by way of example, and the scope of the invention is not limited to the exact details of construction and use. Many other variations are possible with the teachings of the various embodiments.

Fastener "B1" is one "B" embodiment, expressed in this application, as shown in FIGS. 14A thru F. Fastener "B1" has a plurality of points of attachment for hooks, snap devices, clips and bolts: the D-Ring (61), G-Ring (62), and one point of attachment for webbing; the space between the clam shell top (72) and the clam shell bottom (73) and the teeth (74) that protrude from each interior side of clam shell halves.

Fastener "B1" is easily attached to webbing by feeding it through the space between the clam shell top (72) and the thumb latch (68), until the webbing is seated flat, between the respective teeth (74) of the upper and lower half of the clam shell (72, 73). Once seated, the clam shell may be closed, by engaging the following simultaneous actions. The thumb latch (68) must be depressed and pulled backward by applying thumb pressure to the thumb latch ridges (71). The user must simultaneously squeeze the clam shell halves together until the open end lip of the clam shell top (42) is situated under the thumb latch lip (69). FIG. 14-A shows fastener "B1" in the open position. FIG. 14-B shows fastener "B1" in the closed position. To open fastener "B1" and release the webbing, the above procedure is reversed.

The thumb latch (68) rises from its base, situated between the clam shell halves (72, 73), which includes the D-Ring (61) that extends from the clam shell top (72) and G-Ring (62) attachment points, over which it curves. The thumb latch (68) provides three important functions. a) to facilitate the closing of the clam shell; b) to facilitate the opening of the same, and c) to create protection and cover for the G-Ring (62) under adverse conditions.

The D-Ring (61) extends perpendicular to the direction of threading of the host webbing and serves a similar function as commonly used "D-Rings". This half circle extension allows for the attachment of additional devices via use of commonly designed snap devices.

The G-Ring (62) also extends perpendicular to the direction of the threading of the host webbing. Unlike the commonly designed D-Ring, the G-Ring (62) provides a unique point for the direct attachment of snap devices, buckles, slides, glides, strap adjuster and similar devices that are customarily attach via webbing, that must in turn attached to a snap device in order for it to attach to a D-Ring. The unique function of the G-Ring (62) provides a direct attachment of said snap device, but without the need for an intermediary strap or additional connecting hardware. Every additional strap or connecting device is a potential point of failure. It is also an additional cost in economics and complexity. The G-Ring eliminates all that, by facilitating the direct attachment at the point customarily dedicated to a strap or web.

The G-Ring (62) has a connective shape extends that is roughly the equivalent of an upside down letter "G" and extends from the clam shell bottom (73). It includes three G-Ring flex points (63, 64, 65), an access point (66) through which an appropriately designed snap device may pass, to become connected. The access point corners (67) are rounded to facilitated the insertion and removal of any connected device, as described herein.

The upper and lower teeth (74) of fastener "B1" are of varying length and width, to accommodate both the insertion of the webbing within the fastener, and to facilitate its secure attachment to the webbing. Alternative embodiments of the teeth, within the fastener "B" may facilitate movement or adjustment of fastener "B" along the length of the inserted webbing, pursuant to the intended use.

Operation: Fastener "B1" [FIGS. 14-A Thru F]

The manner of using fastener "B1" is multiple and varied. The "D" attachment point may be utilized, with our without the "G" attachment point and vice versa FIGS. 18-A & B. Furthermore, snap devices of standard design are attachable to the D-Ring attachment point of the fastener "B1"

The manner of using the G-Ring attachment point is diverse with many creative options. FIGS. 17-A thru E show a variety of standard snap devices that were originally designed to attach to webbing, but are instead attached directly to fastener "B1".

In the current embodiment, a form of quick release is shown as part of the design. Attached to the G-Ring of Fastener "B1" is side release buckle FIGS. 7-A thru F. FIGS. 5-B shows fastener "B1" (37) attached directly to the female component (46) via the G-Ring (62). The male component (45) of the side release buckle is attached to the fastener strap (35) arriving from the holder. In use, this arrangement allows for the immediate release and removal of the container holder from the waistline webbing/belt of the user, in the example embodiment given hereinabove.

Use of the D-Ring (61) and G-Ring (62) is independent. Some devices may utilize both attachment points simultaneously together. One example of this dual use utilization incorporates a coiled lanyard, with one end attached to the "D" via snap device for permanence, with the opposite end of the lanyard attached both to the tool or accessory, and to the male component of side release buckle, the female component is attached directly to the G-Ring. This configuration allows for the quick release of the tool from the fastener, while the lanyard, still attached firmly to the "D" is stretched during tool use. The tool is immediately useable, but if dropped, is not lost because of its continued attachment to the D-Ring via the lanyard.

DETAILED DESCRIPTION

Fastener "B2" [FIGS. 15A thru G]

The application of fastener "B2" is identical in all aspects described hereinabove to "B1" as they pertain to the D-Ring (61) and G-Ring (62). However, fastener "B2" provides an alternate method of attaching the fastener to the host web or belt. Unlike the "B1" where the host web is fed between the halves of the clam shell, the "B2" incorporates an "over, under, over" threading of the host webbing across the base platform of the fastener.

FIGS. 15-A thru E show outer fingers (81) bracketing a center strut (80) above which extends the D-Ring (61) and to which at one end is attached the G-Ring (62). At the opposite end of the center strut (80) are to outer finger flex points (82). Located at the opposite end of the outer fingers (81) is a outer finger insertion point (83). The space separates the outer fingers (81) from the G-Ring (62) and allows for the insertion of the webbing so that it arrives over the top of each outer finger (81) and extends under the center strut (80). The center strut (80) includes small teeth (84) on the underside. When the host webbing or belt is thread through the fastener using the "over, under, over" configuration, the teeth will prove additional grip, to inhibit movement along the length of the webbing.

An alternative embodiment may allow the teeth to be eliminated. This will facilitate movement of the fastener along the length of the webbing, if the intended use requires.

While the description herein contains many specificities, these should not be construed as limitations on the scope of any embodiment, but as exemplifications of alternative embodiments thereof. Many other ramifications and variations are possible with the teachings of the various embodiments.

Operation: Fastener "B2" [FIGS. 15a Thru G]

The operation of alternative embodiment fastener "B2" resembles all those described about the "B1" embodiment, herein. Both embodiments are equally applicable, with no preference except that which is indicated by the needs and requirements of the intended use.

SUMMARY OF ADDITIONAL EMBODIMENTS

Many other variations are possible with the teachings of the various embodiments as each offers an alternative set of advantages and anticipated uses. Some embodiments present greater structural strength, to accommodate holding greater weight or reliability under extreme environmental conditions. Other embodiments reduce structural strength to reap a lighter weight, a more pliable shape or other important configuration options. By varying the types of fasteners used, whether "A and A", "B and B" or "A and B" the variety of uses and types of attachment options to host devices or users, expands greatly.

Additional considerations include a) the weight of the container b) the weight of its contents, c) the viscosity of the contents d) the environment or special user conditions (such as the user being in motion) in which the container contents may be accessed.

SUMMARY OF ADVANTAGES

From the description and illustration of each embodiment of each component hereinabove, numerous advantages become evident:
1) The Holder
   a. is scalable to accommodate containers of different sizes and shapes
   b. is adaptable in structure and the materials from which it is manufactured—from minimally to highly flexible materials, as dictated by the requirements of its application.
   c. may be fabricated from a vast array of materials including metals, plastics, synthetics, rubbers, carbons, composites as well as an array of natural and synthetic fabrics.
   d. in both its hard and soft embodiments, is functional without the use of latches, buckles or other devices that may fail and are costly to manufacturer, in order to retain the container within the holder.
   e. its soft embodiments offer the advantage of lighter weight, reduced manufacturing costs, easy adaptability to a variety of shapes and sizes and the ability to fold or role the holder with it fasteners into a compact size for storage.
   f. depending upon the fasteners chosen, may be utilized in any position, relative to gravity, with and without the option of fast release and redeployment.
2) Fastener "A";
   a. provides the choice of snap device assembly, pursuant to the needs and specifications of the intended use.
   b. provides a strap connector adjuster that is scalable and incorporable into every choice of snap device assembly.
   c. Is scalable to any dimension, size and load bearing capacity.
   d. is scalable in the number of "spaces and cross bars".
   e. may be fabricated from a vast array of materials either uniformly throughout or in mixed combination.
3) Fastener "B"
   a. In either embodiment, "B1" or "B2" is installable upon the host webbing at the location of use, by simple threading "over and under", or "through" as required and does not require disassembly and or reassembly of the web or strap for installation.
   b. integrated D-Ring attachment point provides all the benefits of a standard D-ring, but with greater ease of installation.
   c. integrated G-Ring provides a direct point of attachment for a vast array of both standard and customized snap devices, without the need for any intermediary strap, web, or additional attachment device.
   d. integrated G-Ring and D-Ring attachment points may be utilized independently or jointly as determined by the intended use, effectively doubling the opportunities for utilization.
   e. The clam shell arrangement of embodiment "B1"
      i. incorporates a thumb latch to provide three functions; 1) the opening and 2) closing of the upper half of the clam shell to secure the host webbing within the fastener, and 3) create a protective cover for the "G-Ring attachment point under adverse conditions.
      ii. provides strength and reliability and secure attachment to the host webbing pursuant to the clam shell top and bottom contiguous material design.
   f. The over, under, over arrangement of embodiment "B2"
      i. provides a simpler, lighter weight design that is
      ii. easier to install on host webbing of greater variation in thickness.

CONCLUSION, RAMIFICATIONS, AND SCOPE

Accordingly the reader will see that, many variations are possible with the teachings of the various embodiments. Each offers an alternative set of advantages and anticipated uses. Some embodiments present greater structural strength and usefulness in extreme environments. Other embodiments reap lighter weight, a more pliable shape, greater options in configuration and more compact storage. Similarly, fastener configuration expands the variety of uses and types of attachments to which the container holder system by be attached, used, transported and redeployed.

In accordance with each embodiment of each component; container holder, fasteners "A" and "B", the applicant provides a quantum improvement in the design of holders and fasteners for attaching, using and deploying containers and/or other accessories, that is simple, inexpensive and easy to use.

While the above description contains many specificities, these should not be construed as limitations on the scope of any embodiment, but as exemplifications of the embodiments described thereof. Many other ramifications and variations are possible with the teachings of the various embodiments. Thus the scope of the invention should be determined by the appended claims and their legal equivalents, and not by the examples given.

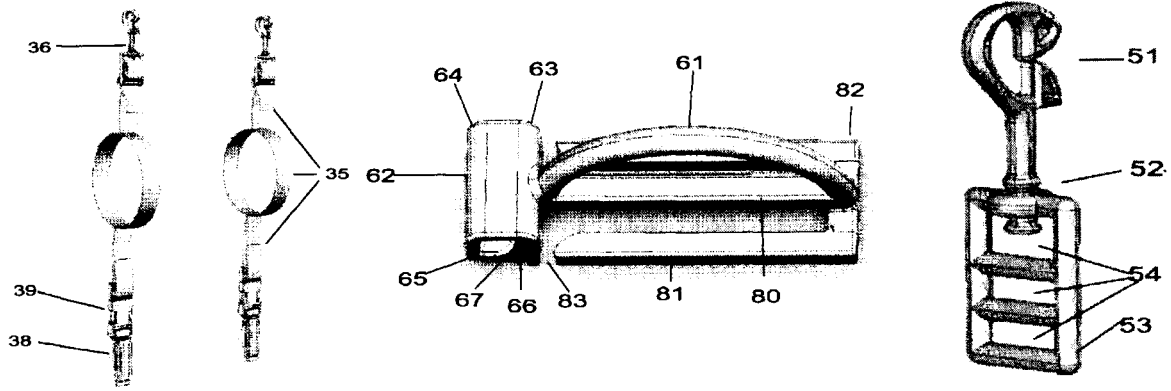

I claim:

1. A holder for a container of predetermined circumference and length comprising: one or more bands each capable of retaining a container inside the band, each band having a plurality of straps attached to and extending away from the exterior of the band; each strap having a fastener on the end capable of attaching that strap to a harness such that the band or bands and a container within the band or bands are held in a stable position relative to the harness; at least one of the fasteners being a first fastener comprising a base portion, a center strut extending away from the base portion and a pair of outer fingers having a first portion extending in opposite directions away from the center strut and a second portion extending from the first portion towards the base portion; a first space between the outer fingers and the center strut such that a strap can be inserted between the fingers and the center strut to attach the fastener to the strap; and a second space between the outer fingers and the base portion to allow for insertion or removal of a strap via the second space.

2. The holder of claim 1, wherein the base of the first fastener includes a hook extending away from the center strut, and the fastener is attached to the strap via a quick release buckle having one end of the buckle inserted into the hook.

3. The holder of claim 2, wherein the first fastener further comprises a semi-circular arch forming a D-ring with the center strut.

4. The holder of claim 3, further comprising teeth located on the center strut for inhibiting movement of the first fastener along a strap located between the outer fingers and center strut.

5. The holder of claim 1, wherein at least one of the fasteners other than the first fastener is a second fastener comprising a hook connected to an attachment member comprising a plurality of rectangular spaces separated by a plurality of cross bar members, the strap extending through all of the rectangular spaces and being doubled back over and passed again through at least one of the rectangular spaces such that the strap forms two layers in that rectangular space.

6. The holder of claim 1, further comprising a cylindrical container within the holder.

7. The holder of claim 6, further comprising a harness to be worn by a user, the fasteners attached to the harness to attach the holder and container to the user.

* * * * *

UNITED STATES PATENT AND TRADEMARK OFFICE
CERTIFICATE OF CORRECTION

PATENT NO.         : 8,622,264 B2                                          Page 1 of 2
APPLICATION NO.    : 12/677549
DATED              : January 7, 2014
INVENTOR(S)        : William Messner It is certified that error appears in the above-identified patent and that said Letters Patent is hereby corrected as shown below:

Delete the title page and substitute therefore with the attached title page showing the corrected illustrative figures. (FIG. 12A has been added as third figure.)

Signed and Sealed this
Seventeenth Day of March, 2015

Michelle K. Lee
*Director of the United States Patent and Trademark Office*

(12) United States Patent
Messner

(10) Patent No.: US 8,622,264 B2
(45) Date of Patent: Jan. 7, 2014

(54) CONTAINER HOLDER WITH FASTENERS

(76) Inventor: William Messner, Forest Park, IL (US)

(*) Notice: Subject to any disclaimer, the term of this patent is extended or adjusted under 35 U.S.C. 154(b) by 476 days.

(21) Appl. No.: 12/677,549

(22) PCT Filed: Aug. 10, 2009

(86) PCT No.: PCT/US2009/053273
§ 371 (c)(1),
(2), (4) Date: Mar. 11, 2010

(87) PCT Pub. No.: WO2010/019501
PCT Pub. Date: Feb. 18, 2010

(65) Prior Publication Data
US 2010/0288801 A1 Nov. 18, 2010

Related U.S. Application Data

(60) Provisional application No. 61/088,895, filed on Aug. 14, 2008, provisional application No. 61/168,609, filed on Apr. 12, 2009, provisional application No. 61/172,798, filed on Apr. 27, 2009.

(51) Int. Cl.
*A45F 5/00* (2006.01)
(52) U.S. Cl.
USPC ............ 224/251; 224/148.4; 224/148.6; 224/250; 224/646; 224/649; 224/647; 24/265 H; 24/321; 24/169; 24/600.7

(58) Field of Classification Search
USPC ........ 224/148.1, 148.5–148.7, 250, 251, 407, 224/572, 649, 651, 269, 641, 646–648, 224/666–667; 248/102, 317, 318, 693, 248/690–692; 24/265 H, 318, 321, 343, 24/344, 346, 169, 198, 200, 543, 265 CD, 24/600.7, 3.12
See application file for complete search history.

(56) References Cited

U.S. PATENT DOCUMENTS

| 304,840 | A | * | 9/1884 | McIver | 24/165 |
| 2,490,207 | A | * | 12/1949 | Cassile | 248/102 |
| 5,325,568 | A | * | 7/1994 | Bruhm | 24/301 |
| 7,988,118 | B2 | * | 8/2011 | Shye | 248/318 |

* cited by examiner

*Primary Examiner* — Adam Waggenspack

(57) ABSTRACT

One design embodiment of a holder for a container comprising: one or more bands each capable of retaining a container inside the band(s), with straps attached to and extending away from the exterior of the band(s); with fasteners on the ends of each strap such that container within the band or bands are held in a stable position relative to a harness to be worn by a user. The design embodiment allows easy attachment, use and deployment of containers in a variety of environmental conditions and situational uses, including but not limited to the carrying of gas supplies for underwater divers.

7 Claims, 27 Drawing Sheets